(12) United States Patent
Murai et al.

(10) Patent No.: US 8,683,577 B2
(45) Date of Patent: Mar. 25, 2014

(54) AUTHENTICATION METHOD, AUTHENTICATION DEVICE AND COMPUTER-READABLE MEDIUM STORING INSTRUCTIONS FOR AUTHENTICATION PROCESSING CAPABLE OF ENSURING SECURITY AND USABILITY

(75) Inventors: Chiho Murai, Yao (JP); Motohiro Asano, Osaka (JP)

(73) Assignee: Konica Minolta Holdings, Inc., Chiyoda-Ku, Tokyo (JP)

( * ) Notice: Subject to any disclaimer, the term of this patent is extended or adjusted under 35 U.S.C. 154(b) by 365 days.

(21) Appl. No.: 12/836,096

(22) Filed: Jul. 14, 2010

(65) Prior Publication Data
US 2011/0023112 A1    Jan. 27, 2011

(30) Foreign Application Priority Data

Jul. 23, 2009 (JP) .................................. 2009-172240

(51) Int. Cl.
*G06F 12/14* (2006.01)

(52) U.S. Cl.
USPC ........... 726/17; 358/1.14; 358/1.15; 358/403; 358/434; 704/8; 704/E17.009; 715/743; 713/170; 713/181; 713/161; 726/21; 726/30; 726/4; 726/5; 705/51; 705/50; 705/7.37; 707/758; 707/999.003; 382/115; 382/124; 709/203; 709/216; 235/375

(58) Field of Classification Search
USPC .......................................................... 726/17
See application file for complete search history.

(56) References Cited

U.S. PATENT DOCUMENTS

| | | | | |
|---|---|---|---|---|
| 6,441,811 B1 * | 8/2002 | Sawada et al. | ............... | 345/204 |
| 7,333,227 B2 * | 2/2008 | Seto | ............... | 358/1.15 |
| 7,594,178 B2 * | 9/2009 | Sakai | ............... | 715/736 |
| 7,619,766 B2 | 11/2009 | Tsuzuki | ............... | 358/1.15 |
| 7,725,718 B2 * | 5/2010 | Langford | ............... | 713/170 |
| 7,984,139 B2 * | 7/2011 | Bacinschi | ............... | 709/224 |

(Continued)

FOREIGN PATENT DOCUMENTS

| | | |
|---|---|---|
| JP | 11-175726 A | 7/1999 |
| JP | H11239257 A | 8/1999 |

(Continued)

OTHER PUBLICATIONS

Office Action from Japanese Patent Office dated Mar. 26, 2013, issued in corresponding Japanese Patent Appln. No. 2009-172240, with English translation thereof (12 pages).

*Primary Examiner* — Krista Zele
*Assistant Examiner* — Ondrej Vostal
(74) *Attorney, Agent, or Firm* — Buchanan Ingersoll & Rooney PC

(57) ABSTRACT

An authentication method in a system having a display and a storage device is provided. The authentication method includes the steps of registering an object selected for each user from among a plurality of visually distinguishable objects prepared in advance as a key object in the storage device; and presenting the plurality of objects to the display, accepting selection of an object by a user to be authenticated, and performing authentication based on matching/mismatching of the selected object with the key object registered in association with the user. The step of registering includes a step of determining a degree of freedom of selection of the object at the time of registration of the key object according to a degree of overlapping of the key object already registered in the storage device.

19 Claims, 25 Drawing Sheets

(56) References Cited

U.S. PATENT DOCUMENTS

| | | | |
|---|---|---|---|
| 8,024,185 B2* | 9/2011 | Do et al. | 704/235 |
| 8,083,141 B1* | 12/2011 | Courtright | 235/383 |
| 8,117,458 B2* | 2/2012 | Osborn et al. | 713/183 |
| 8,314,948 B2* | 11/2012 | Yoshida | 358/1.13 |
| 8,375,039 B2* | 2/2013 | Schwartz et al. | 707/758 |
| 8,392,975 B1* | 3/2013 | Raghunath | 726/7 |
| 2001/0024195 A1 | 9/2001 | Hayakawa | 345/173 |
| 2002/0184538 A1* | 12/2002 | Sugimura et al. | 713/202 |
| 2003/0191949 A1* | 10/2003 | Odagawa | 713/186 |
| 2003/0221131 A1* | 11/2003 | Mori et al. | 713/202 |
| 2004/0102959 A1* | 5/2004 | Estrin | 704/8 |
| 2004/0111648 A1* | 6/2004 | Fujisawa | 713/202 |
| 2004/0151348 A1* | 8/2004 | Ono | 382/115 |
| 2004/0205494 A1* | 10/2004 | Bernius et al. | 715/501.1 |
| 2004/0215960 A1* | 10/2004 | Wakao et al. | 713/161 |
| 2004/0230843 A1* | 11/2004 | Jansen | 713/202 |
| 2005/0210415 A1* | 9/2005 | Bree | 715/848 |
| 2005/0264846 A1 | 12/2005 | Tsuzuki | 358/1.18 |
| 2006/0042483 A1* | 3/2006 | Work et al. | 101/91 |
| 2006/0044622 A1* | 3/2006 | Yasuda | 358/448 |
| 2006/0087691 A1* | 4/2006 | Matsugashita | 358/1.15 |
| 2006/0101507 A1* | 5/2006 | Camenisch | 726/5 |
| 2006/0187879 A1* | 8/2006 | Motegi et al. | 370/331 |
| 2007/0031010 A1* | 2/2007 | Sukegawa et al. | 382/118 |
| 2007/0074119 A1* | 3/2007 | Komine et al. | 715/743 |
| 2007/0076240 A1* | 4/2007 | Ogura | 358/1.14 |
| 2007/0233715 A1* | 10/2007 | Rekimoto | 707/100 |
| 2007/0277224 A1* | 11/2007 | Osborn et al. | 726/2 |
| 2008/0002861 A1* | 1/2008 | Yano et al. | 382/115 |
| 2008/0005788 A1* | 1/2008 | Ramaswamy et al. | 726/4 |
| 2008/0010656 A1* | 1/2008 | Cho | 725/40 |
| 2008/0113791 A1* | 5/2008 | Williams et al. | 463/29 |
| 2008/0126725 A1* | 5/2008 | Morishita et al. | 711/162 |
| 2008/0222710 A1* | 9/2008 | Blagsvedt et al. | 726/7 |
| 2008/0275748 A1* | 11/2008 | John | 705/7 |
| 2008/0309795 A1* | 12/2008 | Mitsuhashi et al. | 348/231.99 |
| 2009/0087036 A1* | 4/2009 | Imaoka | 382/118 |
| 2009/0165104 A1* | 6/2009 | Danielsen et al. | 726/6 |
| 2009/0259560 A1* | 10/2009 | Bachenheimer | 705/26 |
| 2009/0300757 A1* | 12/2009 | Tanaka et al. | 726/20 |
| 2010/0114780 A1* | 5/2010 | Tribe et al. | 705/50 |
| 2010/0202665 A1* | 8/2010 | Mohammad et al. | 382/115 |
| 2010/0280903 A1* | 11/2010 | Barlin et al. | 705/14.58 |
| 2013/0232549 A1* | 9/2013 | Hawkes | 726/3 |

FOREIGN PATENT DOCUMENTS

| | | |
|---|---|---|
| JP | 2001005836 A | 1/2001 |
| JP | 2003-99404 A | 4/2003 |
| JP | 2003-228553 A | 8/2003 |
| JP | 2004013865 A | 1/2004 |
| JP | 2005-335282 A | 12/2005 |
| JP | 2007312310 A | 11/2007 |
| JP | 2008181417 A | 8/2008 |
| JP | 2008257701 A * | 10/2008 |

* cited by examiner

FIG.5
| No. | USER NAME | CORRECT KEY | REGISTRATION DATE/TIME | ... | ... |
|---|---|---|---|---|---|
| 1 | Alice |  | 2008/12/05 08:20 | | |
| 2 | Bob |  | 2009/03/25 10:56 | | |
| 3 | Charlie |  | 2009/04/09 15:35 | | |
| 4 | David |  | 2009/01/05 09:00 | | |
| 5 | | | | | |

FIG.9
| No. | IMAGE | SELECT ALLOWANCE/ PROHIBITION | NUMBER OF REGISTRATIONS | REGISTERED USER NAME |
|---|---|---|---|---|
| 1 |  | N | 2 | Alice Merry |
| 2 |  | Y | 0 | — |
| 3 |  | N | 2 | Bob Mike |
| 4 |  | Y | 0 | — |
| 5 |  | Y | 1 | Charlie |
| 6 |  | Y | 1 | David |
| 7 |  | Y | 0 | — |
| 8 |  | Y | 0 | — |
| 9 |  | Y | 0 | — |

| No. | USER NAME | CORRECT KEY | REGISTRATION DATE/TIME | ... | ... |
|---|---|---|---|---|---|
| 1 | Alice | | 2008/12/05 08:20 | | |
| 2 | Bob | | 2009/03/25 10:56 | | |
| 3 | Charlie | | 2009/04/09 15:35 | | |
| 4 | David | | 2009/01/05 09:00 | | |
| 5 | Erik | | 2009/04/10 15:33 | | |

FIG.15
| No. | IMAGE | SELECT ALLOWANCE/ PROHIBITION | NUMBER OF REGISTRATIONS | REGISTERED USER NAME |
|---|---|---|---|---|
| 1 |  | N | 2 | Alice<br>Merry |
| 2 |  | Y | 0 | — |
| 3 |  | N | 2 | Bob<br>Mike |
| 4 |  | Y | 0 | — |
| 5 |  | N | 2 | Charlie<br>Erik |
| 6 |  | Y | 1 | David |
| 7 |  | Y | 0 | — |
| 8 |  | Y | 0 | — |
| 9 |  | Y | 0 | — |

FIG.17
| No. | CATEGORY | SELECTION ALLOWANCE/ PROHIBITION | TOTAL OF REGISTRATIONS | IMAGE | NUMBER OF REGISTRATIONS | REGISTERED USER NAME |
|---|---|---|---|---|---|---|
| 1 | A | Y | 2 |  | 2 | Alice Merry |
| 2 | | | |  | 0 | — |
| 3 | | | |  | 0 | — |
| 4 | | | |  | 0 | — |
| 5 | B | Y | 2 |  | 2 | Charlie Jane |
| 6 | | | |  | 0 | — |
| 7 | C | N | 3 |  | 1 | David |
| 8 | | | |  | 2 | Bob Mike |
| 9 | | | |  | 0 | — |
152A FIG.18
| No. | CATEGORY | SELECTION ALLOWANCE/ PROHIBITION | TOTAL OF REGISTRATIONS | IMAGE | NUMBER OF REGISTRATIONS | REGISTERED USER NAME |
|---|---|---|---|---|---|---|
| 1 | A | Y | 2 |  | 2 | Alice Merry |
| 2 | | | |  | 0 | — |
| 3 | | | |  | 0 | — |
| 4 | | | |  | 0 | — |
| 5 | B | N | 3 |  | 3 | Charlie Jane Erik |
| 6 | | | |  | 0 | — |
| 7 | C | N | 3 |  | 1 | David |
| 8 | | | |  | 2 | Bob Mike |
| 9 | | | |  | 0 | — |

FIG.21

| No. 1521 | IMAGE 1522 | SELECT ALLOWANCE/ PROHIBITION 1523 | REGISTERED USER NAME 1525 | REGISTRATION DATE/TIME 1529a | CLEARING DATE/TIME 1529b |
|---|---|---|---|---|---|
| 1 |  | N | Alice | 2008/12/05 08:20 | (CURRENTLY REGISTERED) |
| 2 |  | Y | — | — | — |
| 3 |  | N | Bob | 2009/03/25 10:56 | (CURRENTLY REGISTERED) |
| 4 |  | Y | — | — | — |
| 5 |  | Y | Charlie | 2008/11/01 10:34 | 2008/12/20 08:23 |
| 6 |  | N | David | 2009/01/05 09:00 | (CURRENTLY REGISTERED) |
| 7 |  | Y | — | — | — |
| 8 |  | Y | — | — | — |
| 9 |  | Y | — | — | — |

| No. | IMAGE | SELECT ALLOWANCE/ PROHIBITION | REGISTERED USER NAME | REGISTRATION DATE/TIME | CLEARING DATE/TIME | |
|---|---|---|---|---|---|---|
| 1 | | N | Alice | 2008/12/05 08:20 | (CURRENTLY REGISTERED) | |
| 2 | | Y | — | — | — | |
| 3 | | N | Bob | 2009/03/25 10:56 | (CURRENTLY REGISTERED) | |
| 4 | | Y | — | — | — | |
| 5 | | N | Erik | 2009/04/10 15:33 | (CURRENTLY REGISTERED) | |
| 6 | | N | David | 2009/01/05 09:00 | (CURRENTLY REGISTERED) | |
| 7 | | Y | — | — | — | |
| 8 | | Y | — | — | — | |
| 9 | | Y | — | — | — | |

1521 — No.
1522 — IMAGE
1523 — SELECT ALLOWANCE/PROHIBITION
1525 — REGISTERED USER NAME
1529a — REGISTRATION DATE/TIME
1529b — CLEARING DATE/TIME
152B

AUTHENTICATION METHOD, AUTHENTICATION DEVICE AND COMPUTER-READABLE MEDIUM STORING INSTRUCTIONS FOR AUTHENTICATION PROCESSING CAPABLE OF ENSURING SECURITY AND USABILITY

This application is based on Japanese Patent Application No. 2009-172240 filed with the Japan Patent Office on Jul. 23, 2009, the entire content of which is hereby incorporated by reference.

BACKGROUND OF THE INVENTION

1. Field of the Invention

The present invention relates to an authentication method, an authentication device and a computer-readable medium storing instructions for authentication processing capable of ensuring security and usability

2. Description of the Related Art

In view of problems of information leakage in recent years, authentication processing has been used in various scenes for the purpose of enhancing security. For example, when a user intends to operate an information device such as a personal computer or a multifunction peripheral, the user is required to enter an ID and a password, and the operation is allowed only when the entered ID and password match an ID and a password respectively that have been registered in advance.

In the above authentication processing, such a problem is becoming remarkable that a load on the user increases and usability lowers. Specifically, the user has to remember many passwords for various devices, or is required to update frequently the password(s). Further, the operation in itself of entering the password is inconvenient for a user who uses devices without a keyboard such as a compact personal computer, a PDA (Personal Assistance Device) and a cellular phone.

Therefore, various proposals have been made for simplifying the authentication processing. For example, Japanese Laid-Open Patent Publication No. 11-175726 has disclosed an information processing device configured to read out data peculiar to the user when a user enters his/her fingerprint through a terminal provided with a fingerprint authentication device. Japanese Laid-Open Patent Publication No. 2005-335282 has disclosed an image forming device that reads out print data by using corresponding identification information stored in a noncontact IC card held by a user.

For implementing the above method, however, it is necessary to prepare the fingerprint authentication device and/or the noncontact IC card reader, resulting in a problem of increase in cost.

In view of the above, a method that uses an image for the authentication processing is already proposed. For example, Japanese Laid-Open Patent Publication No. 2003-099404 has disclosed a client device and others that can perform authentication by a simple operation without requiring the entry of user's password. Japanese Laid-Open Patent Publication No. 2003-228553 has disclosed a method in which user's personal information formed of at least one unit of information recognizable by the person in question as well as user's non-personal information formed of at least one unit of information unrecognizable by the person in question are registered in advance for the authentication, and it is determined the authentication is successful only when the personal information is selected.

Further, in connection with authentication taking usability into consideration, there has been proposed a scheme in which each user registers in advance an object as a correct key selected from among a plurality of visually distinguishable objects (typically, images or character strings) for using it for the authentication. More specifically, a user selects one certain object from among a plurality of objects such as images or character strings prepared in a system, and registers it in advance as a correct key. In the authentication processing, a list of many objects including the correct key is displayed, and the user selects the object registered as his/her correct key from among the objects displayed in the list form. When the selected object matches the registered correct key, it is determined that the authentication is successful.

The above authentication method suffers from a problem that imbalances are liable to occur in practical selection of the objects from among those displayed as the correct key candidates when the correct key registering operation is performed. Thus, a plurality of users may select the specific object as the correct key from among the objects (i.e., correct key candidates) that are displayed in the list form for selection as the correct key, because the users think that they can remember the above specific object more easily than the others, or the users prefer the above specific object over the other objects. This results in a problem in security. It can be considered that the above is caused by the similarity among the users using the same authentication system. For example, when there are imbalances in gender, age group, hobby and the like, specific objects are likely to be selected, and it can be assumed that a malicious user (attacker) presumes them as the highly possible correct keys.

SUMMARY OF THE INVENTION

An object of the invention is to provide, for overcoming the above problems, an authentication method, an authentication device and computer-readable medium storing instructions for authentication processing that can enhance usability by using visually distinguishable objects, and can ensure a high level in security even when these are used by a plurality of users.

According to an aspect, the invention provides an authentication method provided in a system having a display and a storage device. The authentication method includes the steps of registering an object selected for each user from among a plurality of visually distinguishable objects prepared in advance as a key object in the storage device; and presenting the plurality of objects to the display, accepting selection of an object by a user to be authenticated, and performing authentication based on matching/mismatching of the selected object with the key object registered in association with the user. The step of registering includes a step of determining a degree of freedom of selection of the object at the time of registration of the key object according to a degree of overlapping of the key object already registered in the storage device.

Preferably, the degree of overlapping is determined based on at least one of the number of users registered in association with the object, a period of registration of the object as the key object, and a category to which the object belongs.

Further preferably, the degree of overlapping is determined based on the number of users registered in association with each object.

Further preferably, the step of determining the degree of freedom of the selection includes a step of disabling the registration of an object as the key object when the number of users registered in association with that object or a total of the numbers of users including a user registered in association with that object exceeds a predetermined threshold value.

Further preferably, the degree of overlapping is determined based on the total of the number(s) of the users registered in association with each of the objects belonging to an identical category.

Further preferably, the step of determining the degree of freedom of the selection includes a step of disabling the registration of an object as the key object when the number of users registered in association with that object or a total of the numbers of users including a user registered in association with that object exceeds a predetermined threshold value.

Preferably, the step of determining the degree of freedom of the selection includes a step of displaying registerable object(s) among the plurality of objects prepared in advance but not displaying unregisterable object(s) among the plurality of objects prepared in advance.

Preferably, the step of determining the degree of freedom of the selection includes a step of displaying registerable object(s) among the plurality of objects prepared in advance in a selectable fashion, and displaying unregisterable object (s) among the plurality of objects prepared in advance in an unselectable fashion.

Preferably, the step of determining the degree of freedom of the selection includes a step of displaying the object having a relatively low degree of overlapping with a higher priority.

Preferably, the step of registering includes a step of registering, for each user, a set of objects including the selected key object and a plurality of objects to be displayed together with the selected key object. The step of determining the degree of freedom of the selection includes a step of displaying objects being registerable as the key object that are selected from among the plurality of objects prepared in advance except the objects included in the registered object set.

Preferably, the step of registering includes a step of performing the display allowing turning of pages each including a predetermined number of objects.

According to another aspect, the invention provides an authentication device including a display, a storage device and a processor. The processor is operative to register an object selected for each user from among a plurality of visually distinguishable objects prepared in advance as a key object in the storage device; and to present the plurality of objects to the display, accept selection of an object by a user to be authenticated, and perform authentication based on matching/mismatching of the selected object with the key object registered in association with the user. The processor is configured to determine a degree of freedom of selection of the object at the time of registration of the key object according to a degree of overlapping of the key object already registered in the storage device.

Preferably, the degree of overlapping is determined based on at least one of the number of users registered in association with the object, a period of registration of the object as the key object, and a category to which the object belongs.

Preferably, the processor is configured to display registerable object(s) among the plurality of objects prepared in advance but not to display unregisterable object(s) among the plurality of objects prepared in advance.

Preferably, the processor is configured to display registerable object(s) among the plurality of objects prepared in advance in a selectable fashion, and to display unregisterable object(s) among the plurality of objects prepared in advance in an unselectable fashion.

According to still another aspect, the invention provides a non-transitory computer-readable storage medium, with instructions stored thereon for authentication processing. When the instructions are executed by a processor of a computer, the instructions cause the computer to register an object selected for each user from among a plurality of visually distinguishable objects prepared in advance as a key object in a storage device; and to present the plurality of objects to the display, accept selection of an object by a user to be authenticated, and perform authentication based on matching/mismatching of the selected object with the key object registered in association with the user. The step of registering includes a step of determining a degree of freedom of selection of the object at the time of registration of the key object according to a degree of overlapping of the key object already registered in the storage device.

Preferably, the degree of overlapping is determined based on to at least one of the number of users registered in association with the object, a period of registration of the object as the key object, and a category to which the object belongs.

Preferably, the step of determining the degree of freedom of the selection includes disabling the registration of an object as the key object when the number of users registered in association with that object or a total of the numbers of users including a user registered in association with that object exceeds a predetermined threshold value.

Preferably, the step of determining the degree of freedom of the selection includes displaying registerable object(s) among the plurality of objects prepared in advance but not displaying unregisterable object(s) among the plurality of objects prepared in advance.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of user information stored in an authentication data storage unit shown in FIG. 4.

FIG. 9 shows an example of authentication data stored in the authentication data storage unit shown in FIG. 4.

FIG. 15 shows an example of processing of updating authentication data in a step S94 shown in FIG. 10.

FIG. 17 shows an example of the authentication data according to a modification of the first embodiment.

FIG. 18 shows an example of the processing of updating the authentication data shown in FIG. 17.

FIG. 21 shows an example of authentication data according to the second embodiment of the invention.

FIG. 22 shows an example of the processing of updating the authentication data shown in 21.

DESCRIPTION OF THE PREFERRED EMBODIMENTS

Embodiments of the invention will now be described with reference to the drawings. In the following description, the same or corresponding portions bear the same reference numbers, and description thereof is not repeated.

First Embodiment

System Structure

Figure 1:
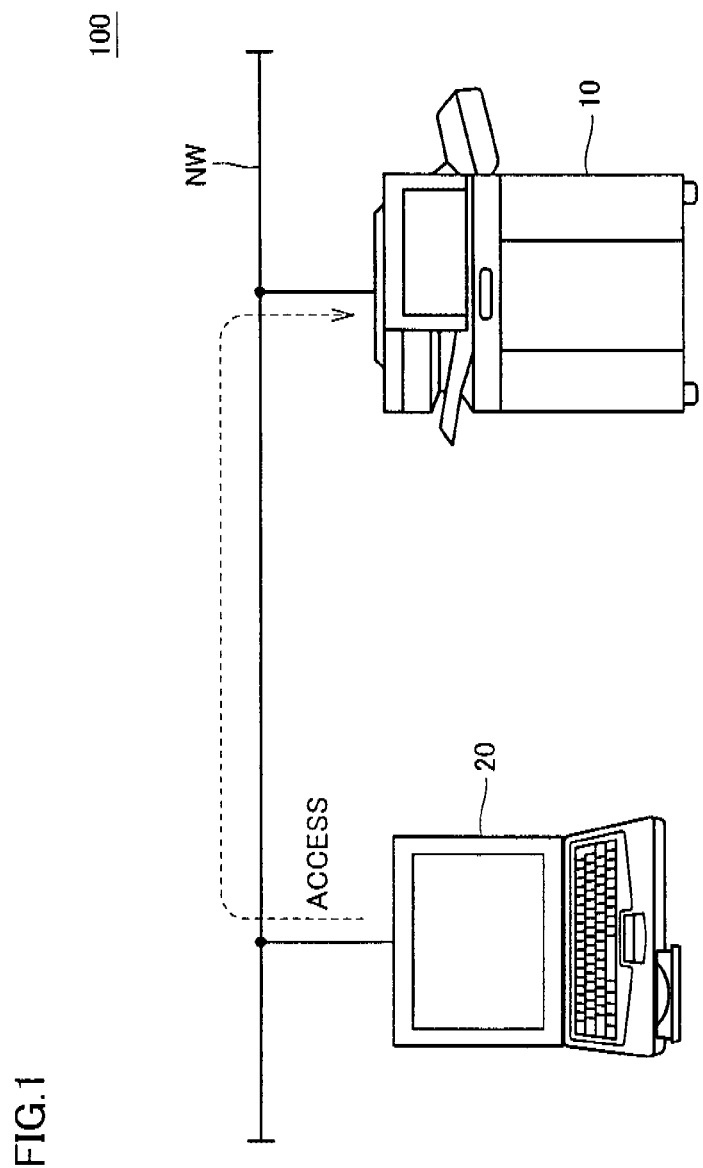
FIG. 1 shows a schematic structure of an authentication system according to a first embodiment of the invention.

Referring to FIG. 1, a structure in which a multifunction peripheral (which may be referred to as an "MFP" hereinafter) 10 and a personal computer (which may be simply referred to as a "PC" hereinafter) 20 are connected over a network NW for data communications is shown as an example of an authentication system 100. MFP 10 and PC 20 are both shown as typical examples of information processing devices. Network NW may be a LAN (Local Area Network) or a WAN (Wide Area Network).

Typically, such a form of use can be supposed that a user of PC 20 accesses MFP 10 to perform various kinds of processing such as print processing or processing of obtaining saved data. In this case, when the user of PC 20 operates PC 20 to access MFP 10, MFP 10 requests execution of authentication processing. Authentication system 100 according to the present embodiment performs the authentication processing using visually distinguishable objects that are independently registered in advance for each user as will be described later. Therefore, the user of PC 20 selects a key object already registered by the same user from among a plurality of objects that are displayed on a screen of PC 20 based on information provided from MFP 10. MFP 10 or PC 20 executes the authentication processing based on the object selected by the user.

In the following description, terms "image authentication" and "image authentication processing" may be used for representing the authentication method according to the embodiment in contrast to authentication using conventional IDs and passwords. Further, the visually distinguishable object may be referred to as the "image". The term of "image" contains an object that is visually distinguishable, and it is intended that the term of "image" contains objects such as "photograph", "illustration", "icon", "character string", "figure", and "symbol" which can be distinguished based on a form, color, pattern or the like. The key object that is registered in advance by each user may also be referred to as a "correct key".

<Hardware Structure>

(1. MFP)

Figure 2:
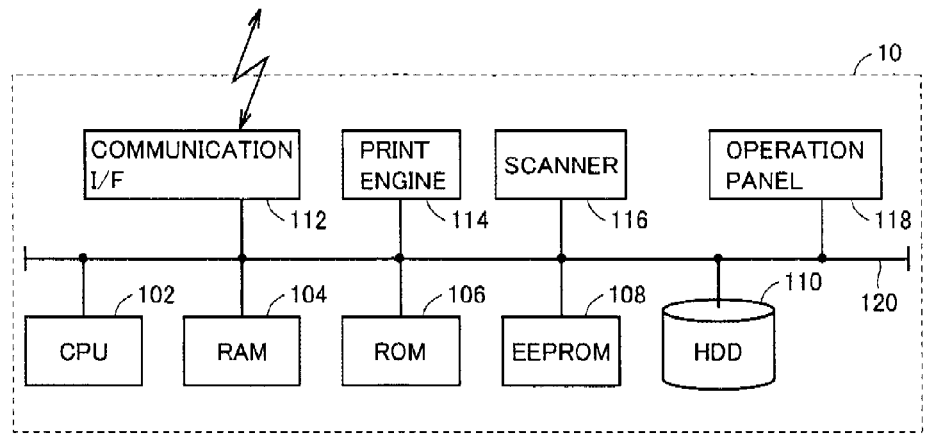
FIG. 2 schematically shows a hardware structure of an MFP according to the first embodiment of the invention.

FIG. 2 schematically shows a hardware structure of MFP 10 according to the first embodiment of the invention. Referring to FIG. 2, MFP 10 according to the first embodiment of the invention includes a CPU (Central Processing Unit) 102 that is processing means, as well as a RAM (Random Access Memory) 104, a ROM (Read Only Memory) 106, an EEPROM (Electrically Erasable and Programmable Read Only Memory) 108 and an HDD (Hard Disk Drive) 100 that are storing means, and also includes a communication I/F (Interface) 112 that is communication means, a print engine 114, a scanner 116 and an operation panel 118 that serves both display means and input means. These portions are mutually connected via an internal bus 120.

In MFP 10, CPU 102 loads instructions prestored in ROM 106 or the like into RAM 104 or the like for executing various kinds of processing including the image authentication processing according to the embodiment, and executes it.

RAM 104 is a nonvolatile memory and is used as a work memory. More specifically, RAM 104 temporarily stores image data and various variables to be used for the image authentication processing, in addition to the programs (a set of instructions) to be executed. EEPROM 108 is typically a nonvolatile semiconductor memory, and stores various configuration values such as an IP address and a network domain of MFP 10, Typically, HDD 110 is a nonvolatile magnetic memory, and stores print jobs received from PC 10, image information obtained by scanner 116 and others.

Communication I/F 112 typically supports general-purpose communication protocols such as Ethernet, and provides the data communications between PC 20 and other MFPs over network NW.

Print engine 114 corresponds to an image forming unit that executes the imageformation processing. Typically, print engine 114 includes a photosensitive drum, a charger, an image writing unit, a developing unit, a transfer unit, a charge removing unit, a fixing device and a cleaning unit. Scanner 116 reads image data from an original or the like.

Operation panel 118 displays a result of processing performed by MFP 10, and accepts user's operations. Typically, operation panel 118 includes a touch panel.

(2. PC)

Figure 3:
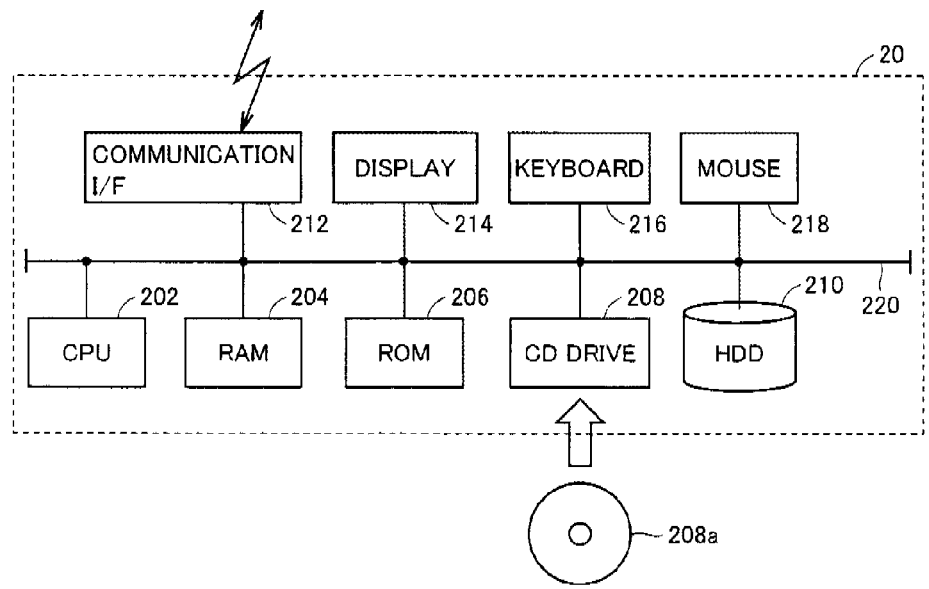
FIG. 3 schematically shows a hardware structure of a PC according to the first embodiment of the invention.

FIG. 3 schematically shows a hardware structure of PC 20 according to the first embodiment of the invention. Referring to FIG. 3, PC 20 according to the first embodiment of the invention includes a CPU 202 that is processing means as well as a RAM 204, a ROM 206 and an HDD 210 that are storage means, and also includes a CD drive 208 that is a data reading unit, a communication I/F 212 that is communication means and a display 214 that is display means as well as a keyboard 216 and a mouse 218 that are input means. These portions are mutually connected via an internal bus 220.

In PC 20, CPU 202 loads an instruction prestored in HDD 210 or the like into RAM 204 or the like, and executes it for executing various kinds of processing including the image authentication processing according to the embodiment. HDD 210 stores programs (a set of instructions) read from a CD-ROM (Compact Disc-Read Only Memory) 208a. The programs generally include an OS (Operating System). Typically, HDD 210 is a nonvolatile magnetic memory.

Communication I/F 212 typically supports general-purpose protocols such as Ethernet, and provides the data communications to/from MFP 10 over network NW.

Display 214 is formed of a liquid crystal display, a CRT (Cathode Ray Tune), a plasma display or the like, and displays results of the processing performed by PC 20 and others. Keyboard 216 accepts user's key entries, and mouse 218 accepts user's pointing operations.

<Functional Structure>

Figure 4:
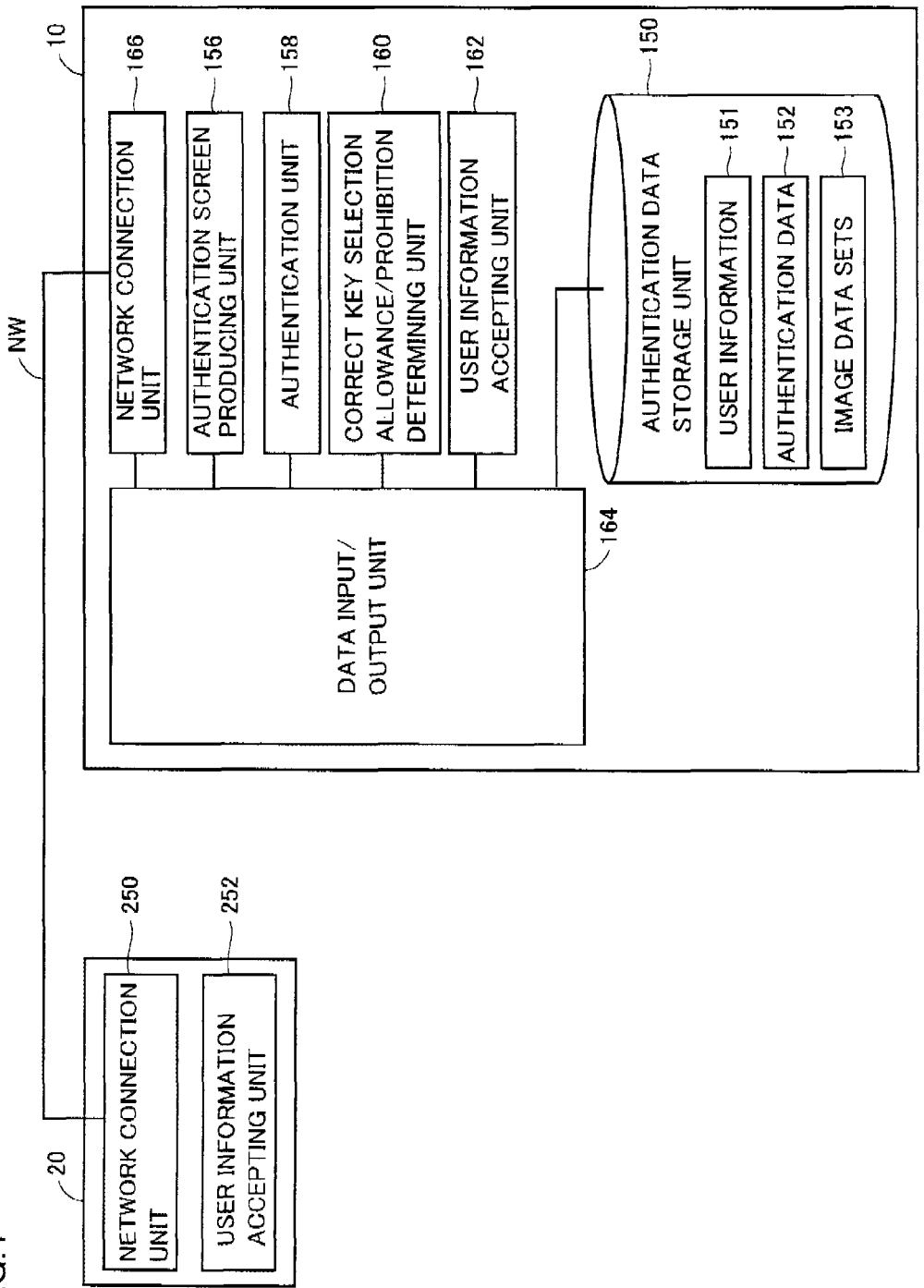
FIG. 4 is a block diagram showing a control structure in the authentication system according to the first embodiment of the invention.

FIG. 4 is a block diagram showing a control structure in authentication system 100 according to the first embodiment of the invention. Referring to FIG. 4, MFP 10 includes, as its control structures, an authentication data (i.e., data for authentication) storage unit 150, a network connection unit 166, an authentication screen (i.e., a screen for authentication) producing unit 156, an authentication unit 158, a correct key selection allowance/prohibition determining unit 160, a user information accepting unit 162 and a data input/output unit 164. Typically, a specific area in HDD 110 of MFP 10 provides authentication data storage unit 150. CPU 102 and communication I/F 112 of MFP 10 cooperate to provide network connection unit 166. Other portions are provided by CPU 102 of MFP 10 executing programs.

PC 20 includes, as its control structure, a network connection unit 250 and a user information accepting unit 252. CPU 202 and communication I/F 212 of PC 20 cooperate to provide network connection unit 250. CPU 202, display 214, keyboard 216 and mouse 218 of PC 20 cooperate to provide user information accepting unit 252.

First, a control function of MFP 10 will be described.

Authentication data storage unit 150 stores user information 151, authentication data 152 and an image data sets 153. User information 151 describes the correct key for performing the image authentication for each user. Authentication data 152 describes information for allowing a new user to select the image as the correct key from among selectable images in setup processing to be described later. Image data sets 153 includes a plurality of images that are prepared in advance for use in the image authentication according to the embodiment. The data stored in authentication data storage unit 150 can be accessed from another portion through data input/output unit 164.

Network connection unit 166 is physically and logically connected to network connection unit 250 of PC 20 over network NW. Network connection unit 166 transmits and receives the data to/from network connection unit 250 of PC 20.

In the authentication processing for each user, authentication screen producing unit 156 dynamically determines an image to be displayed together with the correct key of the user in question, and produces data for displaying the authentication screen. More specifically, authentication screen producing unit 156 produces the authentication input (i.e., input for authentication) screen in which the correct key registered in association with the entered user name (user ID) as well as a plurality of images of incorrect keys (which may also be referred to as "dummy images" hereinafter) are arranged in a random fashion for authentication. Thus, authentication screen producing unit 156 provides a plurality of objects on the display means such as display 214 for accepting the selection of the object by the authentication target user.

Authentication unit 158 determines whether the image selected by a user matches the correct key registered in association with the user ID of the authentication target already selected, or not, and determines based on a result of the determination whether the image verification is successful or not. More specifically, when the image selected by the user matches the registered key image, it is determined that the verification is successful. Thus, authentication unit 158 performs the authentication based on the matching/mismatching of the selected object and the key object registered in association with the user in question.

In the setup processing to be described later, correct key selection allowance/prohibition determining unit 160 specifies the images that the user can select as the correct key, based on authentication data 152 stored in authentication data storage unit 150. More specifically, correct key selection allowance/prohibition determining unit 160 changes the images that the user can select in the setup processing, according to a degree of overlapping of the key object, i.e., a key object overlapping degree for each user. More specifically, correct key selection allowance/prohibition determining unit 160 determines a degree of freedom of object selection at the time of object key registration, according to the degree of overlapping of the key object already registered in authentication data storage unit 150. This processing will be specifically described later.

User information accepting unit 162 accepts the user information (user selection) entered through operation panel 118 (FIG. 2) of MFP 10 or the input unit (keyboard 216 or mouse 218 shown in FIG. 3) of PC 20, and transmits the information to other portions through data input/output unit 164.

Data input/output unit 164 controls the data transmission between the portions already described.

The control function of PC 20 will be described below.

Network connection unit 250 is physically and logically connected to network connection unit 166 of MFP 10 over network NW. Network connection unit 250 transmits the data to/from network connection unit 166 of MFP 10.

User information accepting unit 252 provides the user interface screen relating to the authentication processing and setup processing to be described later, based on the information transmitted from MFP 10 and the like. More specifically, user information accepting unit 252 displays the user ID selection screen, authentication screen, setup screen and the like on display 214 (FIG. 3) for selecting the authentication target user related to the authentication processing. Further, user information accepting unit 252 accepts the user information (user selection) entered through keyboard 216 and mouse 218 of PC 10, and transmits the accepted information to MFP 10 through network connection unit 250.

<User Information>

FIG. 5 shows an example of user information 151 stored in authentication data storage unit 150 shown in FIG. 4. Referring to FIG. 5, user information 151 is described, for example, as a table having at least four columns. More specifically, user information 151 includes, as items of the columns, an item number column 1511, a user name column 1512, a correct key column 1513 and a registration date/time column 1514. Details of the registration of each user are described in one line.

Item number column 1511 describes unique values for respective registered users. User name column 1512 describes IDs for identifying the respective registered users. The user can set any value in user name column 1512. Correct key column 1513 describes the images registered for respective users or the identification information indicating such images. Registration date/time column 1514 describes the dates and times when the respective users registered the correct keys.

For example, FIG. 5 shows an example in which the respective correct keys are registered for four users "Alice", "Bob", "Charlie" and "David".

The image authentication according to the embodiment merely requires the information in user name column 1512 and correct key column 1513. It is not essential to hold the information in the table form shown in FIG. 5.

FIG. 5 shows an example in which one correct key is registered in association with each user. However, a plurality of correct keys may be registered in association with each user. In this case, the system may be configured to determine that the authentication is successful when one of the registered keys is selected (OR conditions), or to determine that the authentication is successful only when all the registered keys are selected (AND conditions).

<Authentication Processing>

The image authentication processing of the present embodiment will be described below.

Figure 6:
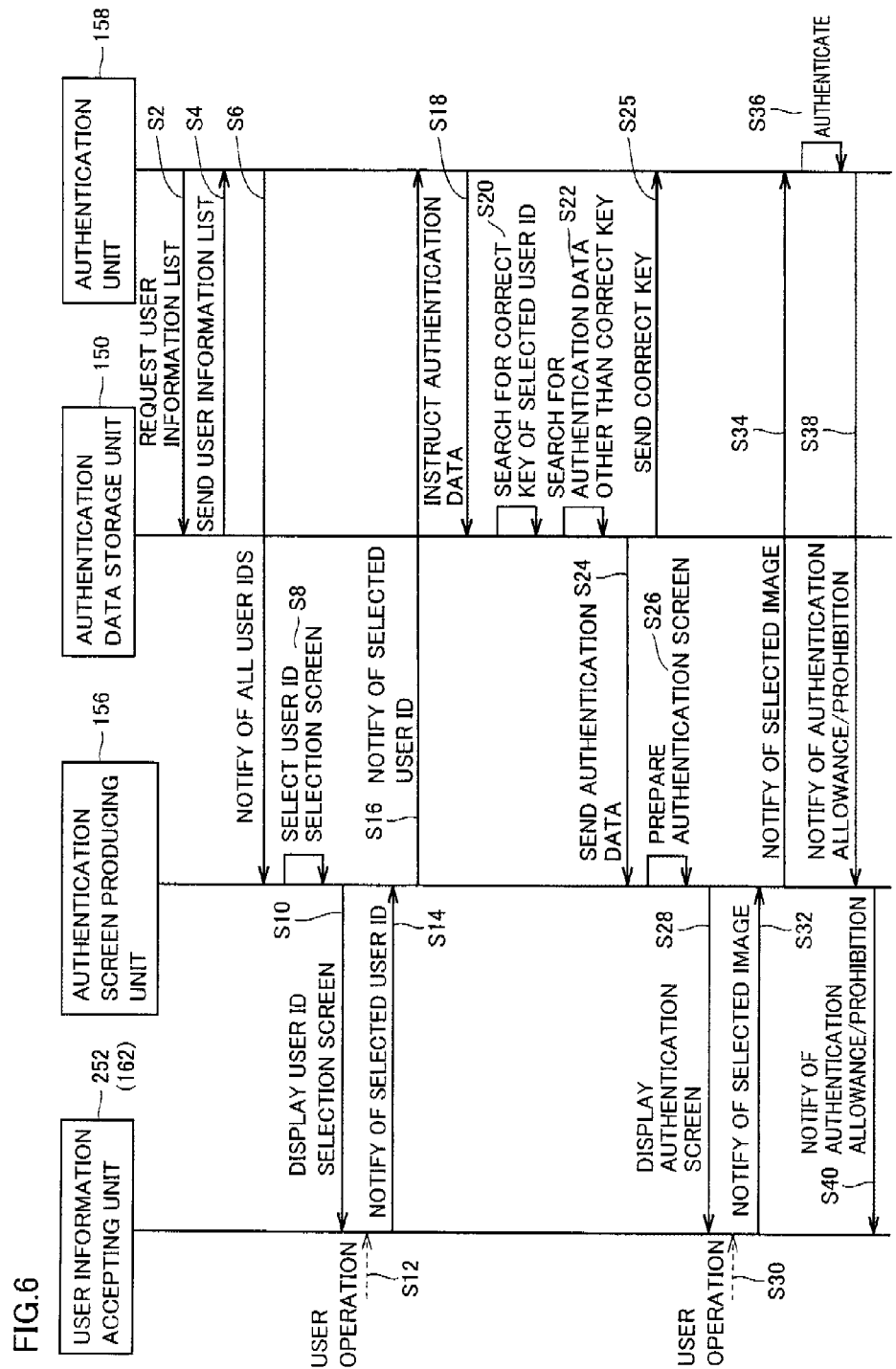
FIG. 6 is a sequence diagram showing a procedure of the authentication processing of the authentication system according to the first embodiment of the invention.

FIG. 6 is a sequence diagram showing a procedure of the authentication processing of authentication system 100 according to the first embodiment of the invention. Each step shown in FIG. 6 is executed by user information accepting unit 252 of PC 20, and by authentication screen producing unit 156, authentication data storage unit 150 and authentication unit 158 of MFP 10. In the case where the authentication processing is executed on operation panel 118 of MFP 10, i.e., when the form of use requires the authentication prior to the operation of MFP 10 by a user, user information accepting unit 162 of MFP 10 executes this processing instead of user information accepting unit 252 of PC 20.

When the image authentication is required, the processing shown in FIG. 6 starts. This image authentication is required under various conditions. For example, the image authentication is requested when PC 20 instructs the execution of the application on MFP 10, or when the access to the data held by MFP 10 is required.

In a step S2, authentication unit 158 requires authentication data storage unit 150 to provide a user information list. In a step S4, authentication data storage unit 150 refers to user information 151 (FIG. 5) stored in itself in response to the request provided by authentication unit 158, and sends the user information list to authentication unit 158. This user information list includes all user IDs that are currently registered in user information 151, (i.e., a list of the values registered in user name column 1512).

In a step S6, authentication unit 158 notifies authentication screen producing unit 156 of all the registered user IDs based on the user information list received from authentication data storage unit 150. In a subsequent step S8, authentication screen producing unit 156 produces information for displaying the user ID selection screen based on all the user IDs received from authentication unit 158. In a subsequent step S10, authentication screen producing unit 156 transmits the information for displaying the user ID selection screen thus produced to user information accepting unit 252 (or user information accepting unit 162). Thereby, user information accepting unit 252 displays the user ID selection screen on display 214 (FIG. 3) or the like based on the received information about the user ID selection screen.

Figure 7:
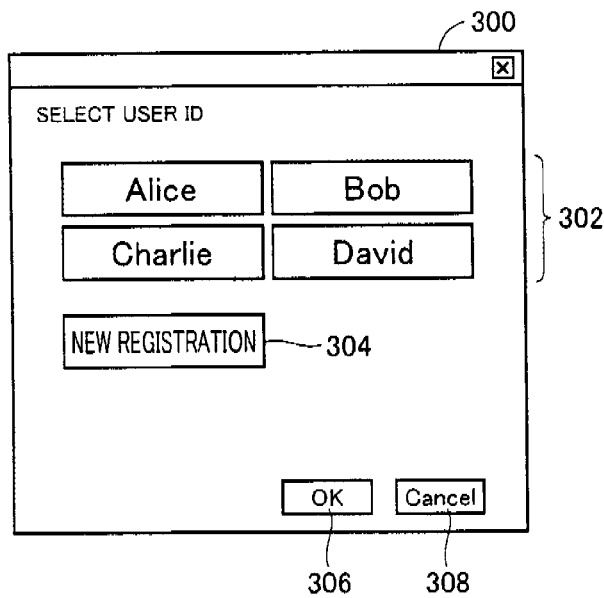
FIG. 7 shows an example of a user ID selection screen displayed in the authentication system according to the first embodiment.

FIG. 7 shows an example of a user ID selection screen 300 displayed in authentication system 100 according to the first embodiment. Referring to FIG. 7, user ID selection screen 300 shows a user ID selection button 302, a new registration button 304, an OK button 306 and a Cancel button 308.

The user who intends to undergo the image authentication presses a button corresponding to the user's ID among user ID selection buttons 302. Then, the user selects OK button 306 to confirm the selection of the user ID. When the user selects Cancel button 308, the user ID already selected is canceled. When new registration button 304 is selected, the setup processing to be described later starts.

Referring to FIG. 6 again, it is now assumed that the user selects OK button 306 on user ID selection screen 300 shown in FIG. 7 after the user selected the button corresponding to the user's own ID (user operation in a step S12). Then, user information accepting unit 252 notifies authentication screen producing unit 156 of the selected user ID in a step S14. In a subsequent step S16, authentication screen producing unit 156 provides the selected user ID thus notified to authentication unit 158.

In a step S18, authentication unit 158 provides an instruction for sending the authentication data to authentication data storage unit 150. In a step S20, authentication data storage unit 150 refers to user information 151 (FIG. 5) stored therein in response to the instruction provided from authentication unit 158, and searches for the registered correct key in association with the selected user ID. In a subsequent step S22, authentication data storage unit 150 refers to image data sets 153 (FIG. 5), and searches for an image (dummy image) other than the correct key retrieved in step S20. In a step S24, authentication data storage unit 150 sends the authentication data including the correct key retrieved in step S20 and the images (dummy images) retrieved in step S22 to authentication screen producing unit 156. In a step S25, authentication data storage unit 150 sends the correct key retrieved in step S20 to authentication unit 158.

In a step S26, authentication screen producing unit 156 produces the information for displaying the authentication screen, based on the authentication data received from authentication data storage unit 150. In a subsequent step S28, authentication screen producing unit 156 transmits the produced information for displaying the authentication screen to user information accepting unit 252 (or user information accepting unit 162). Thereby, user information accepting unit 252 displays the authentication screen on display 214 (FIG. 3) based on the information of the authentication screen received from authentication screen producing unit 156.

Figure 8:
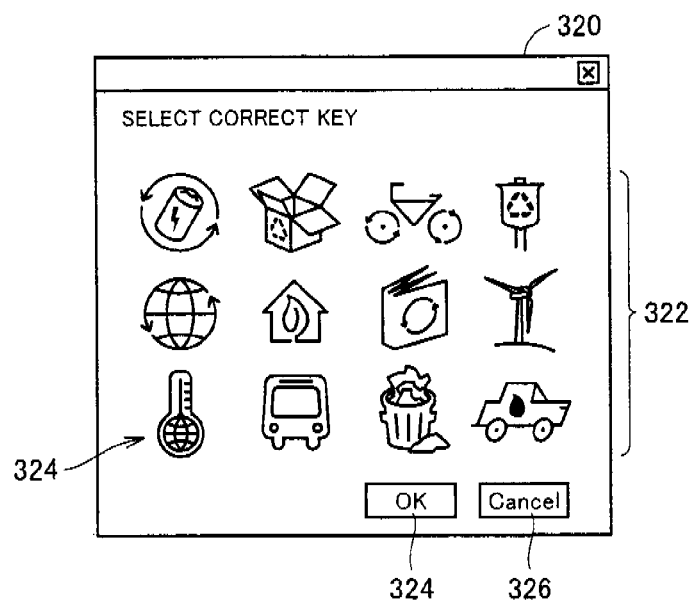
FIG. 8 shows an example of an authentication screen displayed in the authentication system according to the first embodiment.

FIG. 8 shows an example of an authentication screen 320 displayed in authentication system 100 according to the first embodiment. Referring to FIG. 8, authentication screen 320 shows, in a list form (indicated by "322"), a plurality of images including the correct and dummy images. Also, authentication screen 320 shows an OK button 324 and a Cancel button 326.

For example, it is assumed that a button of "Bob" is selected in the authentication screen shown in FIG. 7. In user information 151 shown in FIG. 5, "image of thermometer" is registered in association with the user ID "Bob". Therefore, authentication screen 320 shown in FIG. 8 shows the "image of thermometer" that is the correct key as well as the dummy images other than the correct key in the list form indicated by "322".

The user that is undergoing the image authentication selects (by pressing) the image corresponding to the correct key already registered by the user from among the images displayed in the list form. Then, the user selects OK button 324 to confirm the selection of the correct key. When the user selects Cancel button 326, the image already selected is canceled.

Referring to FIG. 6 again, when the user selects OK button 324 after selecting a certain image in authentication screen 320 shown in FIG. 8 (user operation in a step S30), user information accepting unit 252 notifies authentication screen producing unit 156 of the selected image in a step S32. In a subsequent step S34, authentication screen producing unit 156 notifies authentication unit 158 of the received selected image.

In a step S36, authentication unit 158 executes the authentication based on matching/mismatching of the selected image received from authentication screen producing unit 156 in step S34 with the correct key received from authentication data storage unit 150 in step S25. Specifically, when the image selected by the user matches the correct key already registered in association with the user in question, authentication unit 158 determines that the authentication is successful. Otherwise, it determines that the authentication is failed.

In a subsequent step S38, authentication unit 158 notifies authentication screen producing unit 156 of the authentication success/failure for indicating a result of the authentication in step S36. Subsequently, authentication screen producing unit 156 produces information for displaying the authentication success/failure based on the authentication success/failure notification received from authentication unit 158. In a step S40, authentication screen producing unit 156 transmits the information for displaying the produced authentication success/failure to user information accepting unit 252 (or user information accepting unit 162). Thereby, user information accepting unit 252 displays the authentication success/failure result on display 214 (FIG. 3) or the like based on the information received from authentication screen producing unit 156 for displaying the authentication success/failure.

The processing described above provides the image authentication.

<Security Level>

A security level in the image authentication described above will be discussed below.

It is assumed that the plurality of images (image data sets 153) prepared in advance are handled to allow unlimited overlapping of the images registered as the correct keys of the respective users. Based on this assumption, the following discussion is conducted on a probability with which it is determined that the authentication is successful, when a malicious user makes a first try to select any user ID and any image.

For example, it is assumed that there are one hundred registered users, and one image will be selected as a correct key from among 100 images in the authentication screen (FIG. 8). Also, it is assumed that 50 users have registered an identical image as the correct keys, and the other 50 users have registered other images each of which does not overlap with the others. In this case, possible combinations of the user of the authentication target and another user are $_{100}C_2$ in number. Possible combinations in which the images arbitrarily selected by these two users as the correct keys match each other are $_{50}C_2$ in number.

Therefore, the probability with which the first try of the authentication is successful is $_{50}C_2/_{100}C_2$ equal to 24.74%.

In the following discussion, the overlapping is limited to allow only two or less users to select one image as the correct keys. In this case, it is assumed that two users select an identical image as the correct keys, and other 98 users select, as the correct keys, the images that are different from each other. In this case, there is one combination in which the correct key of the user of the authentication target matches the correct key of another user.

Therefore, the probability with which the first try of the authentication is successful is $1/_{100}C_2$ equal to 0.02%.

When the overlapping of the images to be registered as the correct keys is limited, the security level remarkably increases, as compared with the case where the overlapping is not limited. Further, the security level further rises with increase in number of the users.

Therefore, the authentication system according to the embodiment employs an idea of "degree of overlapping" of the registered correct keys, and the degree of freedom of image selection is determined at the time of registration of the correct key.

In the authentication system according to the embodiment, the "degree of overlapping" is calculated in relation to at least one of the number of registered users of the image, a period of registration of the image as the correct key and a "category" of the image.

Thus, the degree of overlapping is theoretically calculated according to the following equation:

$$F = f(a) \times f(b) \times f(c) \times \omega$$

where a indicates the number of registered users of an image, b indicates the period of registration of the image as the correct key, and c indicates the category accommodating the image. $\omega$ indicates a system coefficient, and corresponds to an adjustment parameter relating to the processing performance of the authentication system. Thus, $\omega$ is a value relating to the total number of the keys and the number of the users using them.

Authentication system 100 according to the first embodiment of the invention is configured to use the relationship of (f(b)=1 and f(c)=1), i.e., to use only the number of the registered users, and thereby to determine the degree of overlapping. Other embodiments will be described later in connection with the implementation that determines the degree of overlapping by using the period of registration of the image as the correct key, and/or by using the category accommodating the image.

<Authentication Data>

FIG. 9 shows an example of authentication data 152 stored in authentication data storage unit 150 shown in FIG. 4. Referring to FIG. 9, authentication data 152 is described, e.g., as a table formed of at least five columns. More specifically, authentication data 152 includes, as items of the columns, an item number column 1521, an image column 1522, a selection allowance/prohibition column 1523, a registration number column 1524 and a registered user name column 1525. Information about each of the images that are prepared in advance is described in one row.

Item number column 1521 describes unique values for identifying the images prepared in advance. Image column 1522 describes the images prepared in advance or identification information indicating the images. Selection allowance/prohibition column 1523 describes information indicating whether selection as a correct key by a new registered user is allowed or not. Registration number column 1524 describes the numbers of the users that have registered the corresponding images as the correct keys. Thus, registration number column 1524 indicates the number of times that each image is registered as the correct keys, and thus the number of times of the overlapping. Registered user name column 1525 describes the user names (user IDs) that have selected the corresponding images as the correct keys.

In the example shown in FIG. 9, there are images each of which is registered as the correct key by a predetermined number (two in this example) of users, and this example disables the registration of each of these images as the correct key for a new user. Thus, the degree of overlapping according to the embodiment is determined based on the number of the registered users of each object. For the image of which registration number is 2 or more, the value of selection allowance/prohibition column 1523 indicating the allowance/prohibition of the registration as the correct key is set to "N".

For example, registration number column 1524 indicates "2" corresponding to each of "image of light bulb" (the value in item number column 1521 is "1") and "image of thermometer" (the value in item number column 1521 is "3"), so that each of the values in selection allowance/prohibition column 1523 corresponding to them is set to "N". Therefore, "image of light bulb" and "image of thermometer" are in the state that disables the registration as the correct key.

In the setup processing to be described later, authentication system 100 according to the embodiment represents the images to the user by representing the images registerable as the correct key in a fashion different from that of the images unregistered as the correct key. This restricts the degree of freedom of image selection by the user when the user registers the image as the correct key.

In the above example, the degree of overlapping of the correct key can be two or less. This value is determined in view of the fact that the probability of the overlapping selection lowers with increase in number of the users. Naturally, the degree of overlapping of the correct key may be one, or may be three of more. However, it is preferable to optimize the degree based on the number of the users to be registered and the number of the images prepared in advance. Further, the threshold value may be dynamically changed according to the number of the registered users.

<Setup Processing>

Then, the setup processing of the embodiment for registering the correct key by each user will be discussed.

Figure 10:
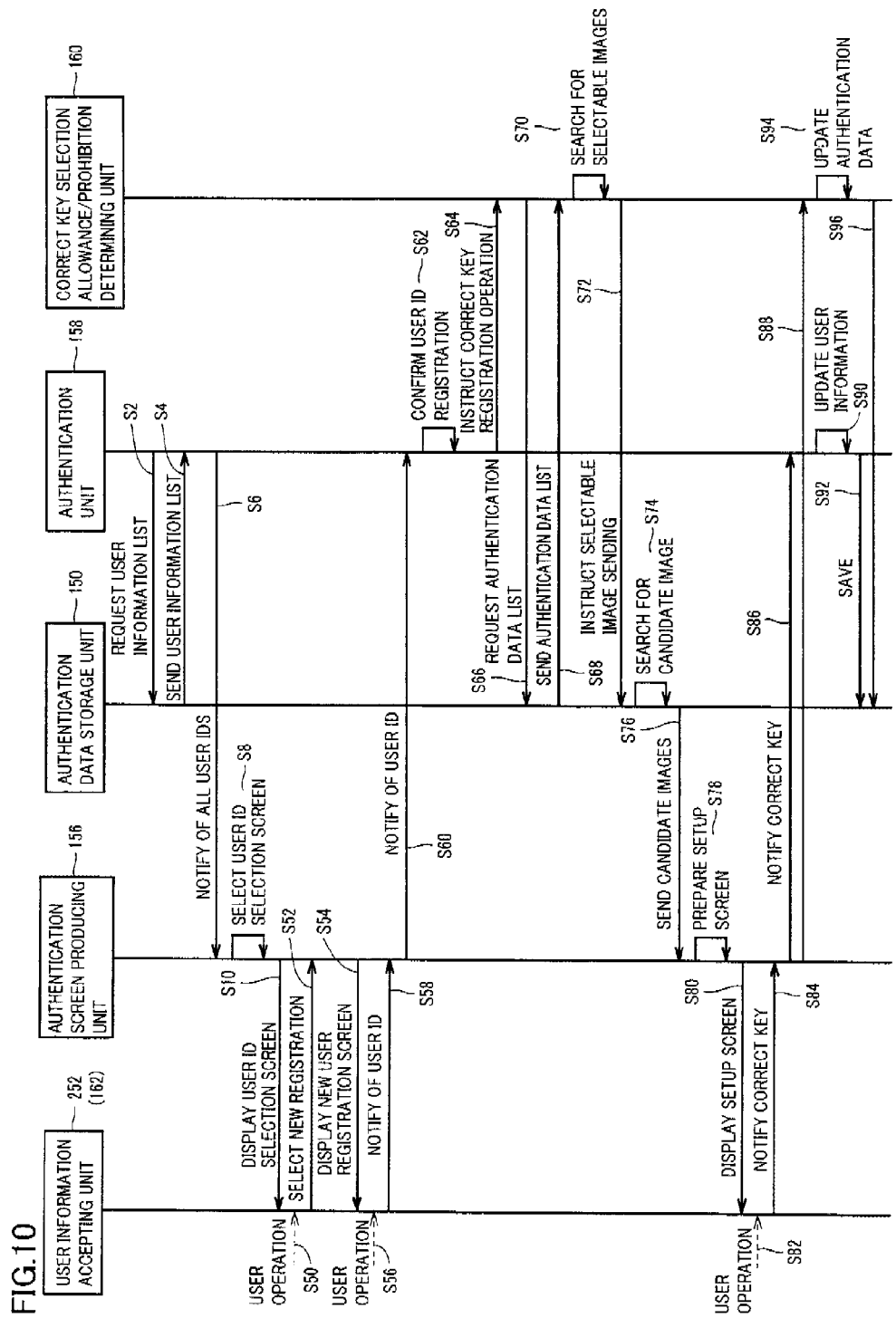
FIG. 10 is a sequence diagram showing a procedure of setup processing in the authentication system according to the first embodiment of the invention.

FIG. 10 is a sequence diagram showing a procedure of the setup processing in authentication system 100 according to the first embodiment of the invention. Each step shown in FIG. 10 is executed by user information accepting unit 252 of PC 20 as well as authentication screen producing unit 156, authentication data storage unit 150, authentication unit 158 and correct key selection allowance/prohibition determining unit 160 of MFP 10 shown in FIG. 4. When the user executes the authentication processing on operation panel 118 of MFP 10, i.e., when the form of use is configured to require the authentication before the user operates MFP 10, user information accepting unit 162 of MFP 10 executes this processing instead of user information accepting unit 252 of PC 20.

The setup processing shown in FIG. 10 is executed by selecting new registration button 304 in user ID selection screen 300 shown in FIG. 7. Therefore, details of the processing in steps S2 to S10 are substantially the same as those in steps S2 to S10 in FIG. 6, and description thereof is not repeated.

In step S50, it is assumed that a user selects new registration button 304 when user ID selection screen 300 shown in FIG. 7 is displayed on display 214 (FIG. 3). Thereby, user information accepting unit 252 notifies authentication screen producing unit 156 of the selection of new registration in a step S52. In a subsequent step S54, authentication screen producing unit 156 provides the information for displaying the new user registration screen to user information accepting unit 252 (or user information accepting unit 162). Thereby, user information accepting unit 252 displays the new user registration screen on display 214 (FIG. 3) or the like based on the information of the new user registration screen received from authentication screen producing unit 156.

Figure 11:
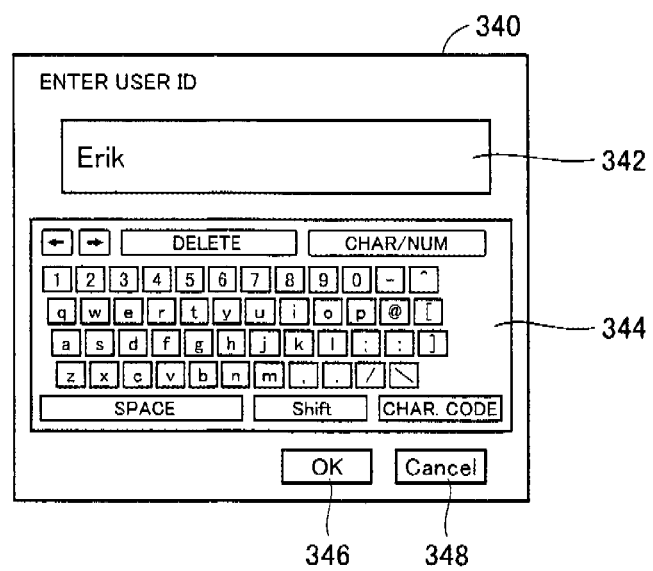
FIG. 11 shows an example of a new user registration screen displayed in the authentication system according to the first embodiment.

FIG. 11 shows an example of a new user registration screen 340 displayed in authentication system 100 according to the first embodiment. Referring to FIG. 11, new user registration screen 340 shows an input display region 342, a soft keyboard 344, an OK button 346 and a Cancel button 348.

The user who intends to register a new correct key operates keyboard 216 (FIG. 3) or soft keyboard 344 to enter a desired user ID. The user ID thus entered is reflected in input display region 342. When the user selects OK button 346 after entering the user ID, this confirms the entry of the user ID. When the user selects Cancel button 348, the user ID already entered is reset.

Referring to FIG. 10 again, it is assumed that the user selects OK button 346 after entering the user's own user ID through new user registration screen 340 shown in FIG. 11 (user operation in step S56). Thereby, user information accepting unit 252 notifies authentication screen producing unit 156 of the entered user ID. In a subsequent step S60, authentication screen producing unit 156 notifies authentication unit 158 of the received user ID.

In a step S62, authentication unit 158 executes the user ID registration confirmation. More specifically, authentication unit 158 determines whether the user ID entered by the user is already registered or not. When the user ID entered by the user is already registered, the setup processing stops.

When the user ID entered by the user is not yet registered, authentication unit 158 provides an operation instruction for the correct key registration to correct key selection allowance/prohibition determining unit 160. In response to the operation instruction for the correct key registration, correct key selection allowance/prohibition determining unit 160 starts the registration processing for the correct key.

First in a step S66, correct key selection allowance/prohibition determining unit 160 requests authentication data storage unit 150 to provide the authentication data list. In a step S68, authentication data storage unit 150 refers to authentication data 152 (FIG. 9) stored in itself in response to the request issued from correct key selection allowance/prohibition determining unit 160, and sends the authentication data list to correct key selection allowance/prohibition determining unit 160. This authentication data list includes the images registered as the correct keys in authentication data 152 as well as the number of registrations of each image (i.e., the list of the values registered in registration number column 1524).

In a step S70, correct key selection allowance/prohibition determining unit 160 searches for the images that can be selected as a candidate for the correct key, based on the authentication data list. In a subsequent step S72, correct key selection allowance/prohibition determining unit 160 provides a sending instruction for the images that can be selected as the correct key to authentication data storage unit 150. This sending instruction includes information for specifying the images that cannot be selected as the correct key. In response to the sending instruction for the selectable images, authentication data storage unit 150 searches for the candidate images displayed in the setup screen (step S74). More specifically, authentication data storage unit 150 refers to image data sets 153 (FIG. 5) stored in it, and retrieves a predetermined number of candidate images from the images except the unselectable images.

In a step S76, authentication data storage unit 150 sends the retrieved candidate image to authentication screen producing unit 156. In a subsequent step S78, authentication screen producing unit 156 produces information for displaying the setup screen based on the candidate image received from authentication unit 158. In a subsequent step S80, authentication screen producing unit 156 transmits the information thus produced for displaying the setup screen to user information accepting unit 252 (or user information accepting unit 162). Thereby, based on the information about the setup screen received from authentication screen producing unit 156, user information accepting unit 252 displays the setup screen on display 214 (FIG. 3) or the like.

Figure 12A:
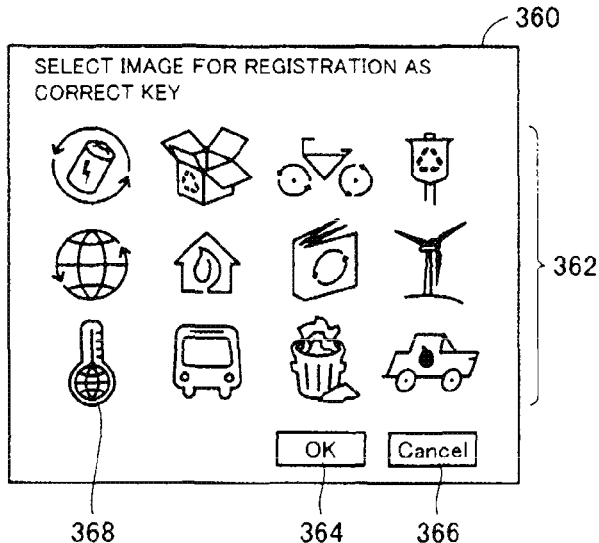
FIGS. 12A to 12C show an example of a setup screen displayed in the authentication system according to the first embodiment.
Figure 12B:
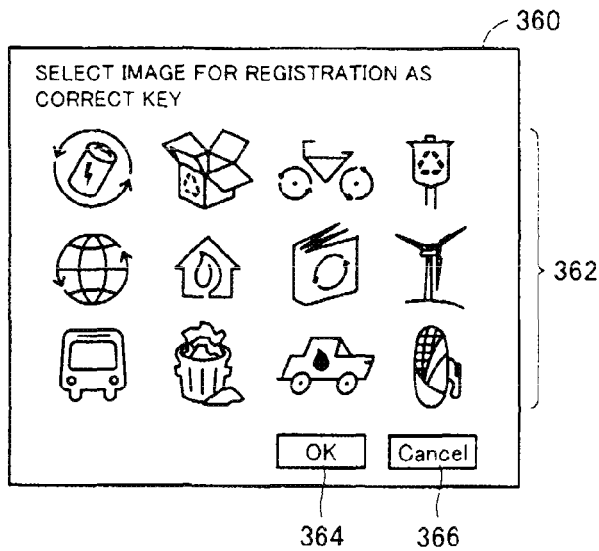
Figure 12C:
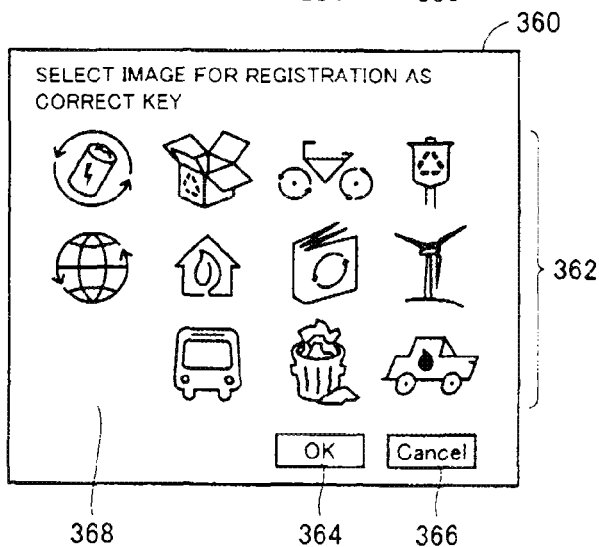

FIGS. 12A to 12C show an example of a setup screen 360 displayed in authentication system 100 according to the first embodiment, Referring to FIG. 12A, setup screen 360 shows a plurality of images that can be candidates for the correct key in a list form indicated by 362. Setup screen 360 also shows an OK button 364 and a Cancel button 366.

During the setup processing, the user selects (by pressing) the image that the user desires to register as the correct key from among the images displayed in the list form. Subsequently, when the user selects the OK button 364, this confirms the selection of the designated image. When the user selects Cancel button 366, this cancels the image already designated.

The system may employ pages each containing a predetermined number of images that can be candidates for the correct key, and may display the images a page at a time. Thus, the images that can be registered as the correct key may be displayed on the plurality of pages.

FIGS. 12B and 12C show display forms in the case where an "image of thermometer" 368 shown in the setup screen of FIG. 12A cannot be selected as the correct key.

Setup screen 360 shown in FIG. 12B does not show "image of thermometer" 368 as the image of the candidate for the correct key. Alternatively, another image, i.e., "image of microphone" is shown as the selectable correct key.

As described above, the display form of the images that can be the candidates for the correct key in the operation of registering the correct key changes based on the degree of overlapping of the registered correct key. In particular, the registerable images among the plurality of images prepared in advance are shown in setup screen 360, but the unregisterable images are not shown.

In another form, "image of thermometer" may be grayed out in setup screen 360 shown in FIG. 12C. In this state, the user cannot select "image of thermometer" 368.

As described above, the display form of the images that can be the candidates for the correct key in the correct key registering process changes according to the degree of overlapping of the registered correct key. In particular, a predetermined number of images among the plurality of images prepared in advance are displayed in the list form, the registerable images are displayed in the selectable fashion and the unregisterable images are displayed in the unselectable fashion.

Further, the system may change the priority of display according to the degree of overlapping. For example, such a manner may be employed that shows the images in the ascending order of the degree of overlapping.

Referring to FIG. 10 again, it is assumed that the user selects OK button 364 in setup screen 360 shown in FIGS. 12A to 12C after selecting one of the registerable images (user operation in a step S82). Thereby, user information accepting unit 252 notifies authentication screen producing unit 156 of the selected correct key in a step S84. In a subsequent step S86, authentication screen producing unit 156 notifies authentication unit 158 of the notified correct key. In parallel with this, authentication screen producing unit 156 notifies correct key selection allowance/prohibition determining unit 160 of the notified correct key in a step S88.

In a step S90, authentication unit 158 updates the details of user information 151 based on the notified correct key. In a subsequent step S92, authentication unit 158 stores updated user information 151 in authentication data storage unit 150.

In parallel with the above, correct key selection allowance/prohibition determining unit 160 updates the details of authentication data 152 based on the notified correct key. In a subsequent step S96, correct key selection allowance/prohibition determining unit 160 stores updated authentication data 152 in authentication data storage unit 150.

The setup processing for registering the correct key by a new user is executed according to the procedure described above. Thus, the objects that are selected for the respective users from among the plurality of visually distinguishable objects (images) are registered as the key objects (correct keys) in the storage device.

<Updating Processing>

Figures 13, 14:
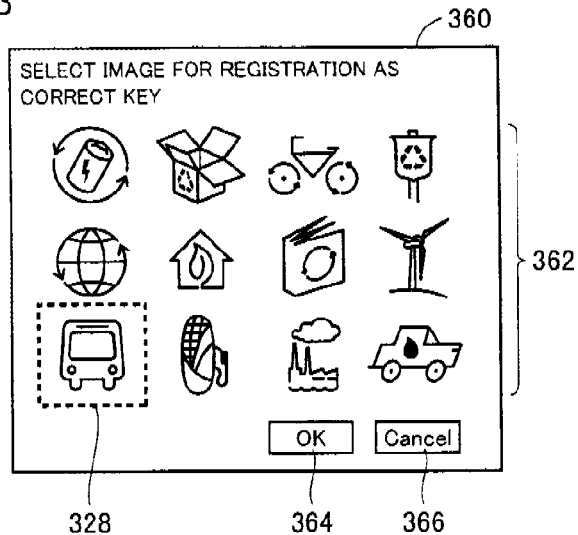
FIG. 13 shows an example of a user's operation on the setup screen displayed in the authentication system according to the first embodiment.
FIG. 14 shows an example of processing of updating user information in a step S90 shown in FIG. 10.

FIG. 13 shows an example of the user's operation on setup screen 360 displayed in authentication system 100 according to the first embodiment. FIG. 14 shows an example of the processing of updating user information 151 in step S90 shown in FIG. 10. FIG. 15 shows an example of the processing of updating authentication data 152 in a step S94 shown in FIG. 10.

For example, as shown in FIG. 11 already described, the user performing the new registration enters "Erik" as the user ID, and selects an "image of bus" 328 as the correct key as shown in FIG. 13.

Thereby, as shown in FIG. 14, the details entered by this new user are added to user information 151. Thus, in the row bearing "5" in item number column 1511, "Erik" is registered as the value of user name column 1512, and the "image of bus" is registered as the value of correct key column 1513. Further, the date and time when the registration processing was executed are stored as the value of registration date/time column 1514.

In parallel with the above, as shown in FIG. 15, the registered details of authentication data 152 are updated corresponding to the details entered by the user. Thus, "Erik" is added as the value of registered user name column 1525 to the row of the "image of bus" corresponding to "5" in item number column 1521. Consequently, the number of the users that have registered the "image of bus" as the correct key becomes equal to the threshold value ("2" in this embodiment) so that the registration thereof as the new correct key is disabled. Therefore, the value in selection allowance/prohibition column 1523 changes from "Y" to "N".

In this manner, the updating is performed for indicating whether the registration as the correct key is allowed or not, according to the currently registered details, when necessary.

<Processing Flow>

The processing procedure relating to the above setup processing can be described collectively as follows.

Figure 16:
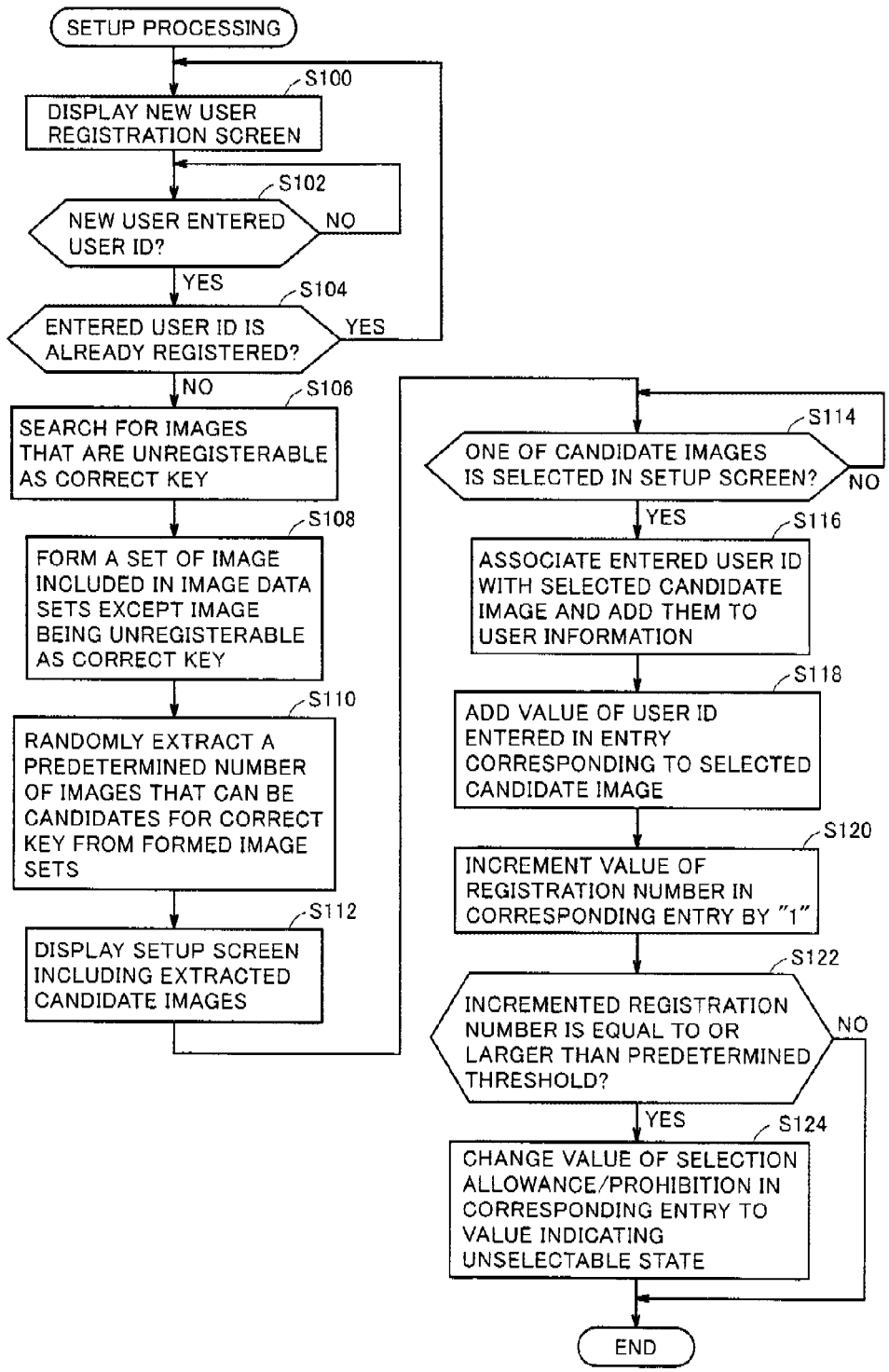
FIG. 16 is a flowchart relating to the setup processing according to the first embodiment of the invention.

FIG. 16 is a flowchart relating to the setup processing according to the first embodiment of the invention. CPU 102 (FIG. 2) executes the instructions to implement each step shown in FIG. 16.

Referring to FIG. 16, CPU 102 first displays the new user registration screen for accepting entry of a user ID by a new user (step S100). Subsequently, CPU 102 determines whether a new user has entered the desired user ID or not (step S102). When the user ID is not entered (NO in step S102), the processing in step S102 repeats.

When the user ID is entered (YES in step S102), CPU 102 determines whether the entered user ID is already registered or not (step S104). When the entered user ID is already registered (YES in step S104), CPU 102 discards the entered user ID, and the process returns to step S100.

When the entered user ID is not yet registered (NO in step S104), CPU 102 refers to authentication data 152, and searches for the images that are in the state disabling registration as the correct key (step S106). Subsequently, CPU 102 forms a set of images including the images in image data sets 153 except the images retrieved in step S106 as the images that cannot be registered as the correct key (step S108). Further, CPU 102 randomly extracts a predetermined number of images that can be the candidates for the correct key from the set of images formed in step S108 (step S110). CPU 102 displays the setup screen including the candidate images extracted in step S110 (step S112).

Subsequently, CPU 102 determines whether any candidate image is selected in the setup screen or not (step S114). When any candidate image is not yet selected (NO in step S114), the processing in step S114 repeats.

When one of the candidate images is selected (YES in step S114), CPU 102 associates the user ID entered in step S102 with the candidate image selected in step S114, and adds them to user information 151 as the new user information (step S116).

Subsequently, CPU 102 adds the value of the user ID entered in step S102 to the entry (row) in authentication data 152 corresponding to the candidate image selected in step S114 (step S118). Further, CPU 102 increments the number of registrations in the corresponding entry of authentication data 152 by "1" (step S120). CPU 102 determines whether the number of registrations incremented by "1" is equal to or larger than the predetermined threshold value, or not (step S122). When the number of registrations incremented by "1" is smaller than the threshold value (NO in step S122), the processing ends.

Whereas, when the number of registrations incremented by "1" is equal to or larger than the predetermined threshold value (YES in step S122), CPU 102 changes the value of selection allowance/prohibition in the corresponding entry of authentication data 152 from "Y" indicating allowance to "N" indicating prohibition (step S124). Then, the processing ends.

<Operation and Effect>

The authentication system according to the present embodiment changes the degree of freedom of the image selection in the correct key registering operation, according to the degree of multiple registrations (overlapping) of the same object (image) as the key object (correct key). This can avoid such a situation that a plurality of users register the same image as the correct keys. Thereby, the security level can be maintained without impairing the usability.

Since a new user can control the candidate images that can be used when the new user registers the image as the correct key, it is not necessary to prepare in advance an enormous number of candidate images for the purpose of avoiding the overlapping of the correct keys. Therefore, the system can be simpler, and the required resources can be reduced.

Modification of the First Embodiment

The first embodiment has been described in connection with the example of the implementation in which the number of registrations per image is taken into consideration as the degree of overlapping. However, the total of the numbers of registrations per category to which the image belongs may be taken into consideration as the degree of overlapping. This is because such a case may occur that images belonging to a specific category, i.e., images suggesting a similar concept are selected more times than the others.

The authentication system according to this modification is similar to authentication system 100 according to the first embodiment already described and shown in FIG. 1, and therefore description thereof is not repeated. Also, the hardware structures of the MFP and the PC are substantially the same as those already described and shown in FIGS. 2 and 3, respectively, and therefore description thereof is not repeated.

The control structure in the authentication system according to this modification is substantially the same as that shown in FIG. 4 except for the data structure of the authentication data to be described later, and therefore description thereof is not repeated. The procedure of the authentication processing in the authentication system according to the modification is substantially the same as that in the sequence diagram of FIG. 6, and therefore description thereof is not repeated.

<Authentication Data>

FIG. 17 shows an example of authentication data 152A according to the modification of the embodiment. FIG. 18 shows an example of the processing of updating authentication data 152A shown in FIG. 17.

Referring to FIG. 17, authentication data 152A is described, by way of example, in a table form having at least seven columns. More specifically, authentication data 152A includes, as items of the columns, item number column 1521, a category column 1526, a selection allowance/prohibition column 1527, a registration total column 1528, image column 1522, registration number column 1524 and registered user name column 1525. Information about each image prepared in advance is described in one row, and the information about the images belonging to an identical category is defined in a plurality of rows.

Thus, the plurality of images prepared in advance are classified under the categories that are smaller in number than the images.

Item number column 1521 describes unique values for identifying the respective images prepared in advance. Category column 1526 describes values indicating the categories to which the images belong. Selection allowance/prohibition column 1527 describes the information indicating, for each category, whether the user performing the new registration can select the image as the correct key or not. Registration total column 1528 describes the total number of the users who have selected the images belonging to the corresponding category as the correct keys. Thus, for each of the images belonging to an identical category, registration total column 1528 describes the degree of overlapping registration as the correct key. Image column 1522 describes each of the images prepared in advance or the identification information indicating each image. Registration number column 1524 describes the number of the users who have registered the corresponding image as the correct key. Registered user name column 1525 describes the name of user (user ID) who has selected the corresponding image as the correct key.

In this modification, the total number of the users who have registered the images belonging to an identical category as the correct keys is deemed as the degree of overlapping. Thus, in this modification, the degree of overlapping is determined based on the total number of the users who have registered the objects (images) belonging to an identical category.

When the value described in registration total column 1528 exceeds a predetermined threshold value, the system disables the registration of the images belonging to the category in question as the correct key by a new user.

In the example shown in FIG. 17, the three images belonging to the category "C" are registered as the correct keys of the one user, two users and zero user, respectively, and all the images in category "C" are registered as the correct keys by the three users. For example, the system is configured to disable the registration of the correct key by a new user when such conditions are satisfied that the users who have registered the images belonging to an identical category are three or more in total. In this case, the system disables the registration of any image belonging to this category "C" as the correct key by the new user.

Whereas, the images in each of other categories "A" and "B" are registered as the correct keys by two users as a whole, and therefore the new user is allowed to register the image as the correct key.

Then, description will be given on the processing performed when a new user registers one of the images as the correct key in the state shown in FIG. 17. For example, the user of user ID "Erik" registers the "image of bus" (corresponding to No. 3) belonging to category "B" as the correct key similarly to the foregoing processing in FIGS. 14 and 15.

Thereby, as shown in FIG. 18, the details entered by the new user performing the new registration are added to authentication data 152A. Thus, "Erik" is registered as the value in registered user name column 1525, corresponding to the row of "5" in item number column 1511. Consequently, the number of users (value in registration number column 1524) who have registered the "image of bus" as the correct keys is updated from "2" to "3". Thereby, the total number (value in registration total column 1528) of the users who have registered the images in category "B" of the "image of bus" is updated from "2" to "3". Consequently, the total number of the users who have registered the images in category "B" becomes equal to the predetermined threshold value ("3" in this example) so that the new registration of the image belonging to this category as the correct key is disabled. Therefore, the value in selection allowance/prohibition column 1527 changes from "Y" to "N".

As described above, whether the selection as the correct key is allowed or not is updated according to the currently registered details, when necessary. The images belonging to the categories that are determined as being unselectable for the correct key may not be displayed at all or may be displayed in the unselectable fashion in the setup processing.

In the above example, the allowed degree of overlapping of the correct keys in the same category is three. This degree may change depending on the number of images belonging to an identical category. Thus, the system may dynamically change the threshold value for each category according to the number of the images belonging to the target category.

<Processing Flow>

The processing procedure relating to the above setup processing can be described collectively as follows.

Figure 19:
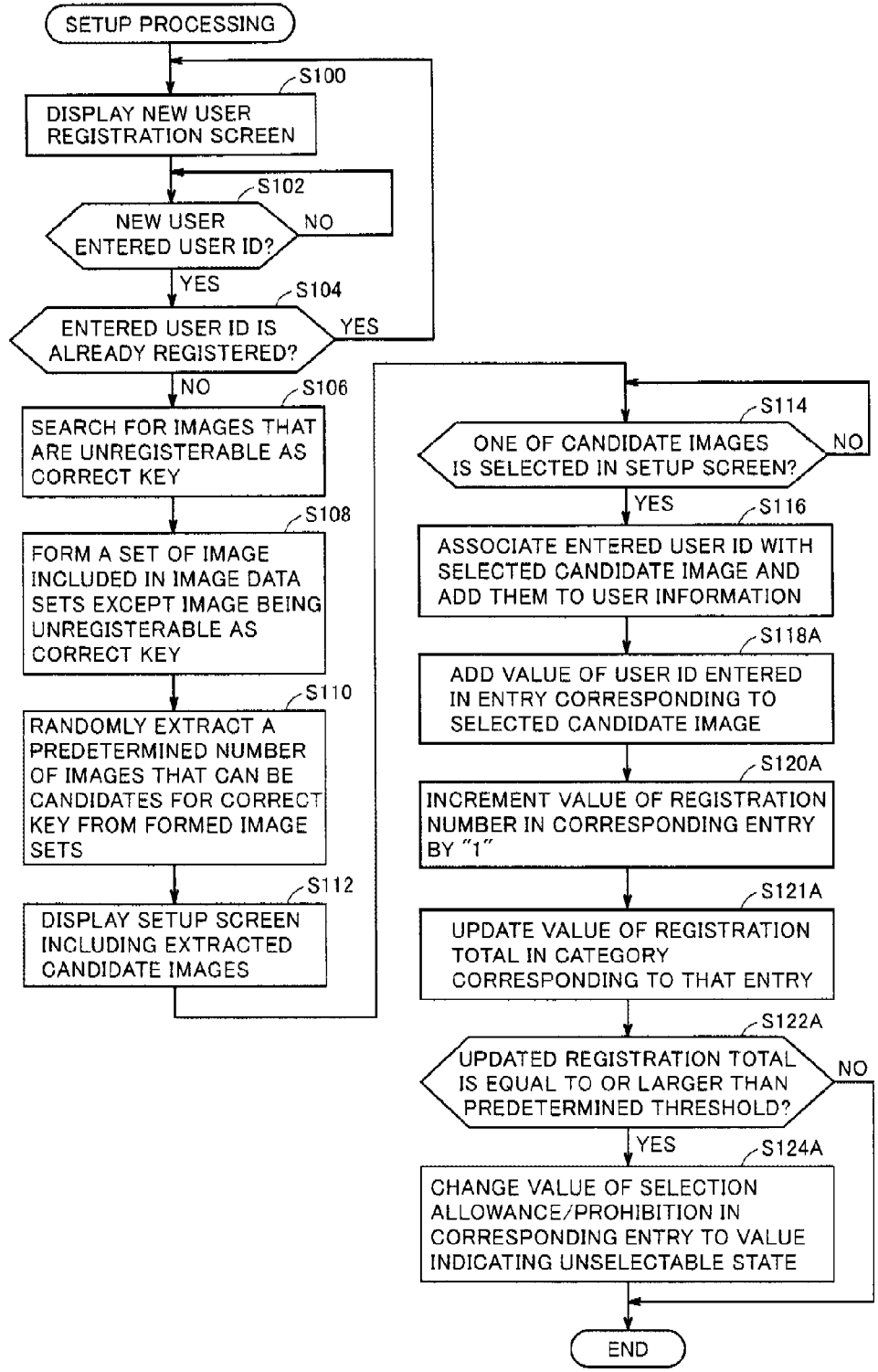
FIG. 19 is a flowchart relating to the setup processing according to the modification of the first embodiment of the invention.

FIG. 19 is a flowchart relating to the setup processing according to the modification of the first embodiment of the invention. CPU 102 (FIG. 2) executes the instructions to implement each step in FIG. 19.

The processing in steps S100 to S116 shown in the flowchart of FIG. 19 is substantially the same as that in steps S100 to S116 shown in the flowchart of FIG. 16, and therefore description thereof is not repeated.

Referring to FIG. 19, CPU 102 adds the value of the user ID entered in step S102 to the entry (row) in authentication data 152A corresponding to the candidate image selected in step S114 (step S118A) after the processing in step S116. Further, CPU 102 increments the number of registrations in the corresponding entry in authentication data 152A by "1" (step S120A). CPU 102 updates the value of the registration total in the category corresponding to that entry (S121A).

Subsequently, CPU 102 determines whether the total number of registrations after the updating is equal to or larger than the predetermined threshold value or not (step S122A). When the total number of registrations after the updating is smaller than the predetermined threshold value (NO in step S122A), the processing ends.

Whereas, when the total number of registrations after the updating is equal to or larger than the predetermined threshold value (YES in step S122A), CPU 102 changes the value of selection allowance/prohibition in the corresponding category of authentication data 152A from "Y" indicating allowance to "N" indicating prohibition (step S124A). Then, the processing ends.

<Operation and Effect>

The authentication system according to the embodiment changes the degree of freedom in selection of the image in the correct key registering operation, according to the degree of overlapping registration (degree of overlapping) of the objects (images) belonging to each category as the key objects (correct keys). This can avoid such a situation that specific images contained in a group and suggesting similar concepts are registered in the overlapping fashion as the correct keys. Thereby, the security level can be maintained without impairing the usability.

Second Embodiment

The first embodiment and the modification thereof have been described in connection with the example of the implementation that determines an overlapping degree F., using the relationship of (f(b)=1, and f(c)=1), i.e., using only the number of the registered users. A second embodiment will be described in connection with an example of the implementation that determines overlapping degree F., using the period of registration of the image as the correct key.

The authentication system according to the second embodiment of the invention is substantially the same as authentication system 100 according to the first embodiment of the invention already described and shown in FIG. 1, and therefore description thereof is not repeated. Also, the hardware structures of the MFP and the PC are substantially the same as those already described and shown in FIGS. 2 and 3, respectively, and therefore description thereof is not repeated.

The control structure in the authentication system according to this embodiment is substantially the same as that shown in FIG. 4 except for the data structure of the authentication data to be described later, and therefore description thereof is not repeated. The procedure of the authentication processing in the authentication system according to the second embodiment is substantially the same as that in the sequence diagram of FIG. 6, and therefore description thereof is not repeated.

In this embodiment, however, the processing of deregistering the user ID and/or the correct key can be executed.

<User Interface of Setup Processing>

Figure 20:
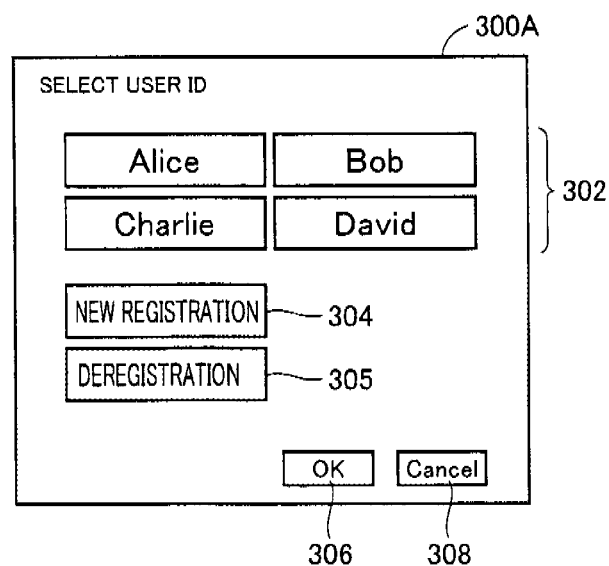
FIG. 20 shows an example of a user ID selection screen displayed in the authentication system according to a second embodiment of the invention.

FIG. 20 shows an example of a user ID selection screen 300A displayed in the authentication system according to the second embodiment of the invention. Referring to FIG. 20, user ID selection screen 300A additionally includes a deregistration button 305 arranged in user ID selection screen 300 shown in FIG. 7.

Basically, it is preferable that a higher security level is set for the processing of deregistering the user ID and/or the correct key. Therefore, it is preferable that user ID selection screen 300A shown in FIG. 20 is displayed only when the system enters an administrator mode after authentication is performed using a password for an administrator. Alternatively, the system may be configured to perform the above display only when a user having a registered user ID performs a special operation after the authentication using user's own password (preferably, a regular character password) is performed.

In user ID selection screen 300A, when the administrator selects deregistration button 305, processing for deregistering the correct key is executed. Specifically, the system displays a screen (not shown) for selecting the target user ID to be deregistered. Subsequently, when the administrator selects the target user ID to be deregistered, i.e., to be released from the registration as the correct key, CPU 102 deletes the corresponding entry in user information 151 (FIG. 4), and updates the date and time of deregistration by adding them to the corresponding entry in an authentication data 152B.

When each user deregisters the user's own correct key, the system does not display the screen for selecting the user ID to be deregistered, and displays the screen including the currently registered correct key of the user as well as a button for confirming the execution of the deregistration.

<Authentication Data>

FIG. 21 shows an example of authentication data 152B according to the second embodiment of the invention. FIG. 22 shows an example of the processing of updating authentication data 152B shown in FIG. 21.

Referring to FIG. 21, authentication data 152B describes, by way of example, a table formed of at least six columns. More specifically, authentication data 152B includes, as items of the columns, item number column 1521, image column 1522, selection allowance/prohibition column 1523, registered user name column 1525, a registration date/time column 1529a and a deregistration date/time column 1529b. Information about each image prepared in advance is described in one row.

Item number column 1521 describes the unique values for identifying the images prepared in advance. Image column 1522 describes the images prepared in advance or the identification information indicating the images. Selection allowance/prohibition column 1523 describes information indicating whether selection as a correct key by a new registered user is allowed or prohibited. Registered user name column 1525 describes the user names (user IDs) that have registered the corresponding images as the correct keys. Registration date/time column 1529a describes the dates and times when the respective users registered the correct keys. Deregistration date/time column 1529b describes the dates and times when the respective users deregistered the correct keys.

The authentication system according to the present embodiment substantially restricts the number of the users that can register each image as the correct key to one. Thus, the system does not allow the overlapping registration of an identical image as the correct keys for different users. More specifically, the image that can be selected by the new user as the correct key is restricted to the image of which deregistration date/time is described in deregistration date/time column 1529b, or the image of which registration date/time is not described in registration date/time column 1529a.

The system may be configured to eliminate the image from a set of the images selectable as the correct keys when a predetermined period has not elapsed from the date and time of the image in question described in deregistration date/time column 1529b. The provision of this condition can prevent the user from erroneously identifying the image that had previously been registered as the correct key, when the image is shown as a dummy image in the authentication screen.

According to the example shown in FIG. 21, the respective images corresponding to the rows "1", "3" and "6" are already registered as the correct keys. Therefore, these images may not be displayed at all, or may be displayed in the unselectable fashion in the setup processing.

Whereas, no value is described in registration date/time column 1529a in connection with the respective images corresponding to the rows "2", "4", "7", "8" and "9" so that it can be understood that these had not been registered as the correct key. These images may be displayed in the selectable fashion as the candidate images in the setup processing.

For the image of "5" in item number column 1511, the value of "Dec. 20, 2008 8:23" is described in deregistration date/time column 1529b. Therefore, it is understood that this image had been registered as the correct key of user ID "Charlie" but is not currently registered as the correct key. In principle, therefore, the registration of this image as the correct key by a new user is allowed. However, when such conditions are already set that the registration as the correct key by another user is allowed only after a predetermined period elapsed from the date and time of last deregistration of the correct key, the elapsed time from the date and time described in deregistration date/time column 1529b is calculated, and the registration as the correct key is allowed only when the above elapsed time exceeds a predetermined threshold value.

When the user of user ID "Erik" registers the "image of bus" corresponding to the row of "5" in item number column 1511 as the correct key, authentication data 152B shown in FIG. 21 is updated as shown in FIG. 22.

Thus, the value of registered user name column 1525 corresponding to the row of "5" in item number column 1511 changes from "Charlie" who is the last user to the user ID "Erik" of a new user. Further, the date and time when the new user registered the image as the correct key is described as the new value in registration date/time column 1529a. At the same time, the value indicating that the image is currently registered as the correct key is described in deregistration date/time column 1529b. This disables the registration of the "image of bus" as the correct key by the new user.

The second embodiment has been described in connection with the example of the implementation in which registration date/time column 1529a and deregistration date/time column 1529b in authentication data 152B are used to define the period of registration as the correct key. However, the system may be configured to perform the management by describing a period of validity in user information 151 and/or authentication data 152 (152B). In this case, the system may be configured to request the updating of the correct key when the period of validity expires.

<Processing Flow>

The processing procedure of the above setup processing can be described collectively as follows.

Figure 23:
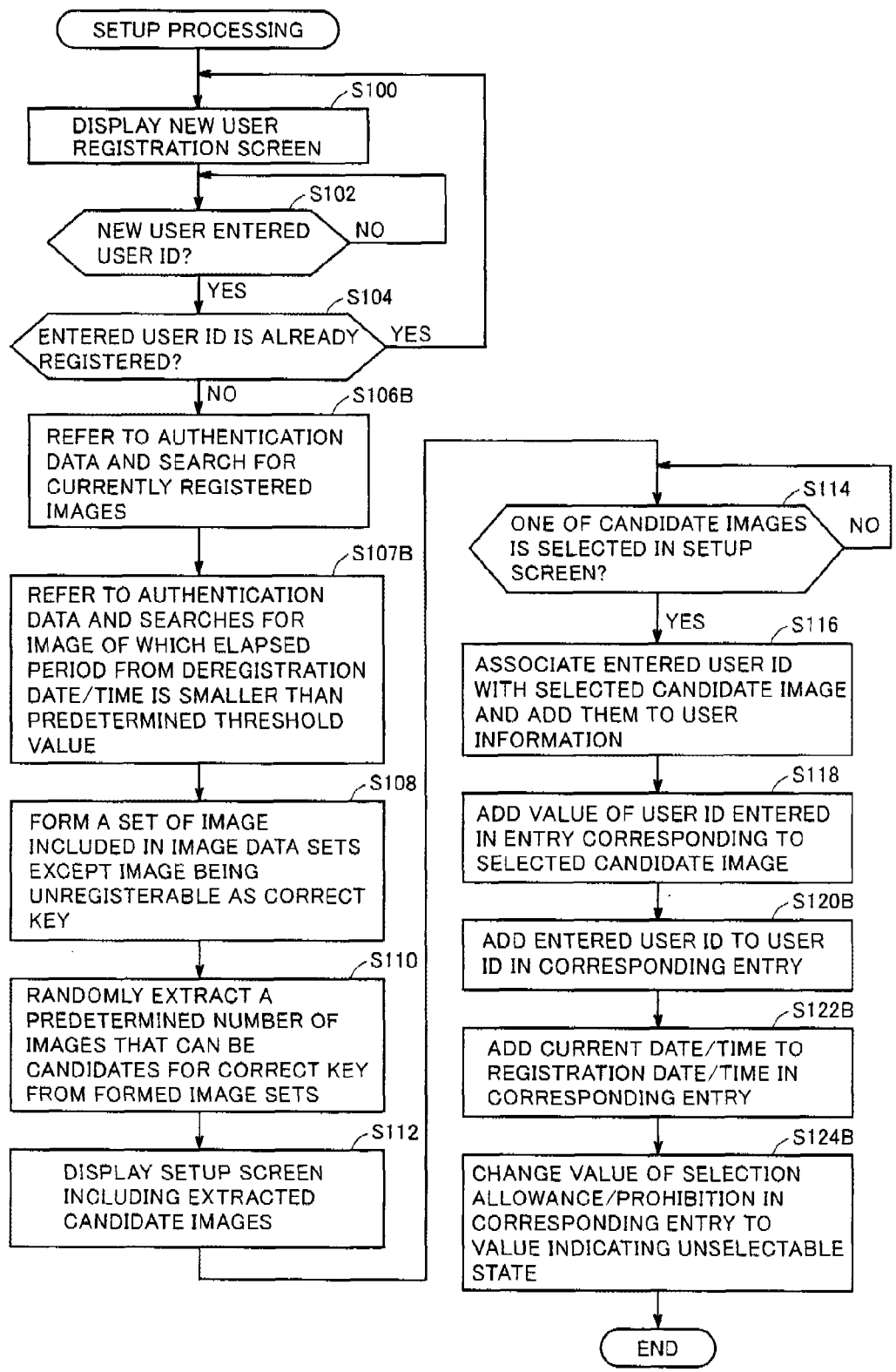
FIG. 23 is a flowchart relating to a setup processing according to the second embodiment of the invention.

FIG. 23 is a flowchart relating to the setup processing according to the second embodiment of the invention. CPU 102 (FIG. 2) executes the instructions to implement each step in FIG. 23. In FIG. 23, the steps of performing the same processing as those shown in FIG. 16 bear the same reference numbers.

Referring to FIG. 23, CPU 102 first displays the new user registration screen for accepting entry of a user ID by a new user (step S100). Subsequently, CPU 102 determines whether the new user has entered the desired user ID or not (step S102). When the user ID is not entered (NO in step S102), the processing in step S102 repeats.

When the user ID is entered (YES in step S102), CPU 102 determines whether the entered user ID is already registered or not (step S104). When the entered user ID is already registered (YES in step S104), CPU 102 discards the entered user ID, and the process returns to step S100.

When the entered user ID is not yet registered (NO in step S104), CPU 102 refers to authentication data 152B, and searches for the images that are currently registered (step S106B). Subsequently, CPU 102 refers to authentication data 152B, and searches for the image of which elapsed period from the date and time (value described in deregistration date/time column 1529b) of the deregistration to the current date and time is smaller than a predetermined threshold value (step S107B).

Further, CPU 102 forms a set of images including the images in image data sets 153 except the images retrieved in steps S106B and S107B as the images that cannot be registered as the correct key (step S108). Further, CPU 102 randomly extracts a predetermined number of images that can be the candidates for the correct key from the set of images formed in step S108 (step S110). CPU 102 displays the setup screen including the candidate images extracted in step S110 (step S112).

Subsequently, CPU 102 determines whether any candidate image is selected in the setup screen or not (step S114). When any candidate image is not yet selected (NO in step S114), the processing in step S114 repeats.

When one of the candidate images is selected (YES in step S114), CPU 102 associates the user ID entered in step S102 with the candidate image selected in step S114, and adds them to user information 151 as the new user information (step S116).

CPU 102 adds the value of the user ID entered in step S102 to the entry (row) in authentication data 152 corresponding to the candidate image selected in step S114 (step S118). Subsequently, CPU 102 adds the user ID entered in step S102 to the user ID (registered user name column 1525) in the corresponding entry in authentication data 152B (step S120B), and adds the current date and time to the registration date and time (registration date/time column 1529a) in the corresponding entry of authentication data 152B (step S122B). Further, CPU 102 changes the value of the selection allowance/prohibition in the corresponding category of authentication data 152B from "Y" indicating allowance to "N" indicating prohibition (step S124B). Thereby, the processing ends.

<Operation and Effect>

Since the authentication system according to the present embodiment avoids the multiple or overlapping registration of each object (image) as the key object (correct key), it can maintain a higher security level. Further, even when an image that was registered as the correct key by a certain user is already deregistered, the system can prohibit the registration of this image as the correct key if a time elapsed after the deregistration is relatively short. This can avoid the disadvantage of confusion of the correct key.

Third Embodiment

The first embodiment, the modification thereof and the second embodiment have been described in connection with the examples of the implementation that does not prohibit the overlapping of the correct key and the dummy image. The third embodiment will be described in connection with an example of the implementation structure that sets the correct key and the dummy images for each user. In this case, the processing is executed to attain (f(a)=0), i.e., to maintain overlapping degree F. at 0.

The authentication system according to the third embodiment of the invention is substantially the same as authentication system 100 according to the first embodiment shown in FIG. 1. Therefore, description thereof is not repeated. Also, the hardware structures of the MPF and the PC are substantially the same as those in FIGS. 2 and 3, respectively. Therefore, description thereof is not repeated.

Figure 24:
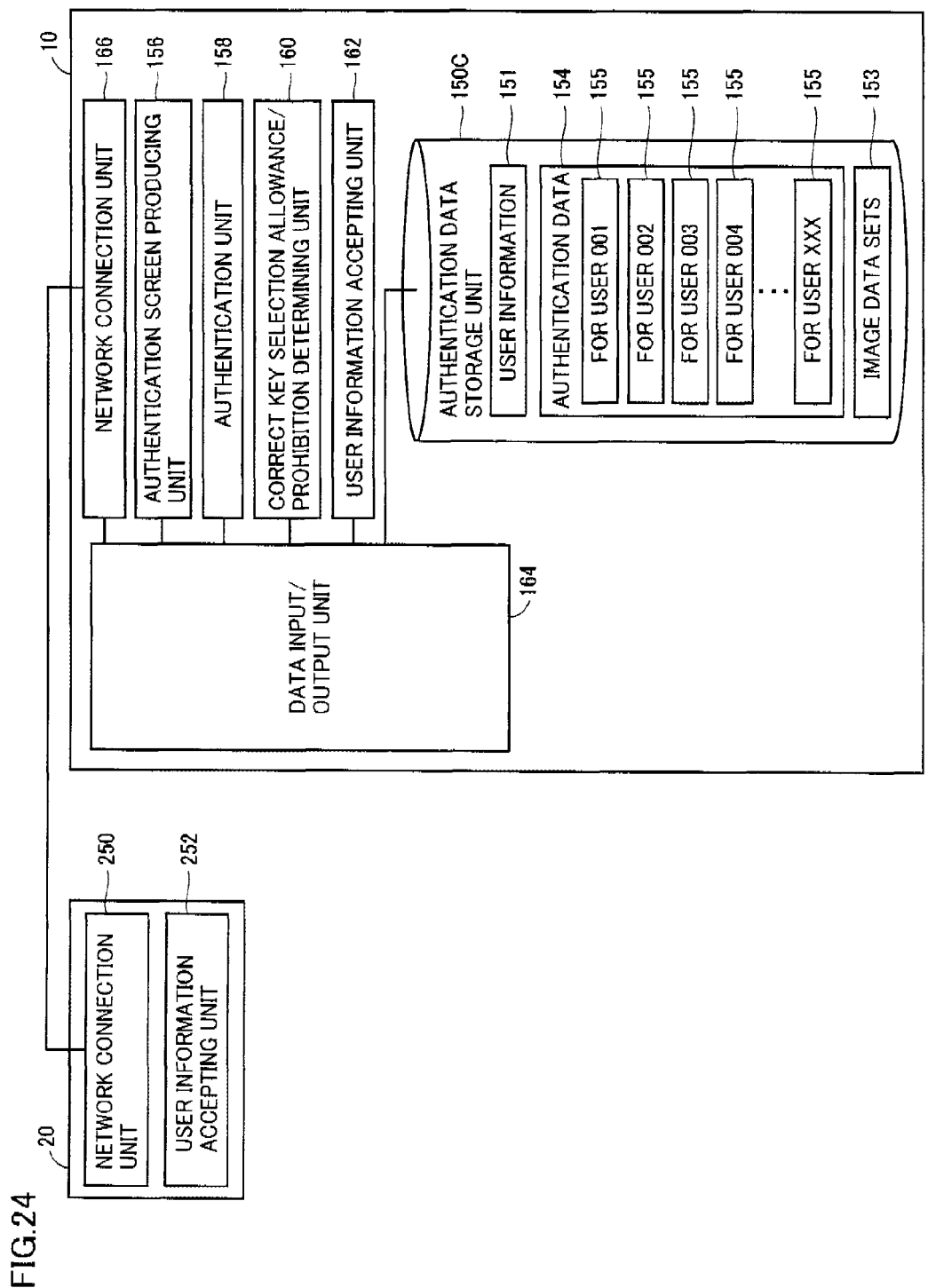
FIG. 24 is a block diagram showing a control structure in the authentication system according to a third embodiment of the invention.

FIG. 24 is a block diagram showing a control structure in the authentication system according to the third embodiment of the invention. The authentication system according to the present embodiment differs from the authentication system according to the first embodiment of the invention shown in FIG. 4 in that authentication data storage unit 150 of MFP 10 stores authentication data 154 instead of authentication data 152. Other portions are the same as the corresponding portions in FIG. 4, and therefore description thereof is not repeated. Authentication data 154 includes personal authentication data 155 for each user who has registered the correct key.

Figure 25:
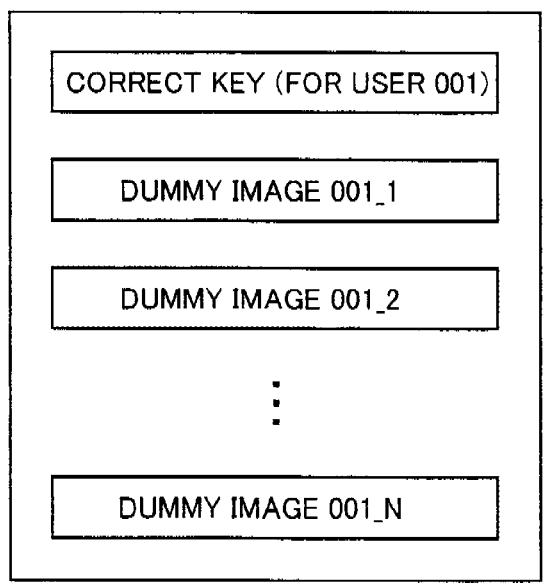
FIG. 25 shows an example of a data structure of personal authentication data shown in FIG. 24.

FIG. 25 shows an example of a data structure of personal authentication data 155 shown in FIG. 24. Referring to FIG. 25, each item of personal authentication data 155 is formed of the correct key for the corresponding user as well as a plurality of dummy images to be displayed in the authentication screen together with the correct key in the authentication processing. The system is configured such that any one of the images (the correct image and the dummy images) included in personal authentication data 155 for each user do not overlap the image included in personal authentication data 155 for the other users. For avoiding such a situation that the common dummy images are always displayed in the authentication screen, it is preferable that personal authentication data 155 includes the dummy images larger in number than the dummy images to be displayed together in the authentication screen.

<Processing Flow>

The processing procedure for the setup processing according to the embodiment is as follows.

Figure 26:
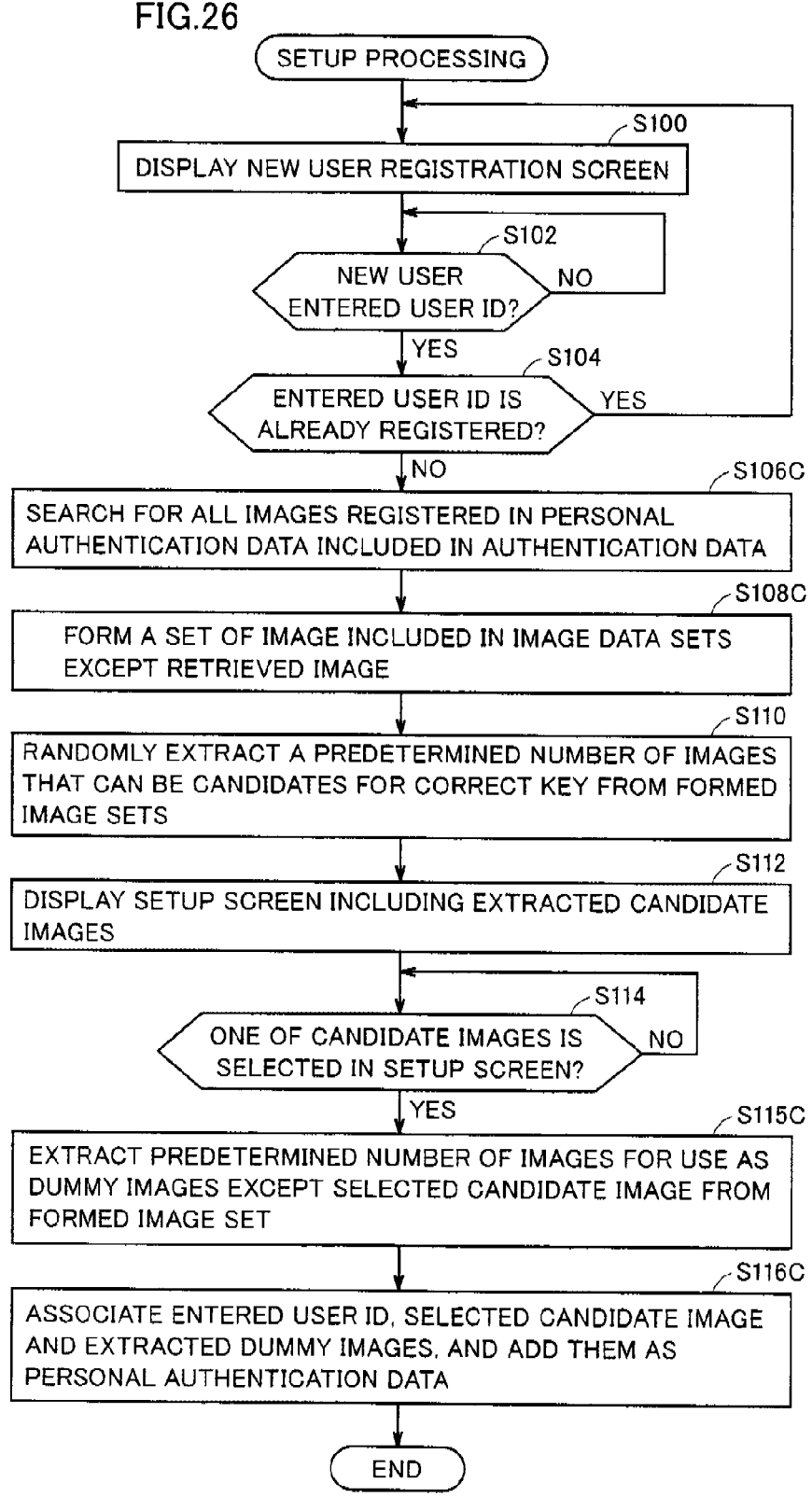
FIG. 26 is a flowchart relating to a setup processing according to the third embodiment of the invention.

FIG. 26 is a flowchart relating to the setup processing according to the third embodiment of the invention. CPU 102 (FIG. 2) executes the instructions to implement each step in FIG. 26. The steps in FIG. 26 for performing the same processing as those shown in FIG. 16 bear the same reference numbers.

Referring to FIG. 26, CPU 102 first displays a new user registration screen for accepting entry of a user ID by a new user (step S100). Subsequently, CPU 102 determines whether the new user has entered the desired user ID or not (step S102). When the user ID is not entered (NO in step S102), the processing in step S102 repeats.

When the user ID is entered (YES in step S102), CPU 102 determines whether the entered user ID is already registered or not (step S104). When the entered user ID is already registered (YES in step S104), CPU 102 discards the entered user ID, and the process returns to step S100.

When the entered user ID is not yet registered (NO in step S104), CPU 102 refers to authentication data 154, and retrieves all the images that are registered in personal authentication data 155 included in authentication data 154 (step S106C). Subsequently, CPU 102 forms a set of images including the images in image data sets 153 except the images retrieved in step S106C (step S108C). Further, CPU 102 randomly extracts a predetermined number of images that can be the candidates for the correct key from the set of images formed in step S108C (step S110). CPU 102 displays the setup screen including the candidate images extracted in step S110 (step S112). Thus, the images that can be registered as the correct key are selected from the set of images including the plurality of images prepared in advance except the images included in the set of the images already registered (in personal authentication data 155 for each user), and the images thus selected are displayed.

Subsequently, CPU 102 determines whether any candidate image is selected in the setup screen or not (step S114). When any candidate image is not yet selected (NO in step S114), the processing in step S114 repeats.

When one of the candidate images is selected (YES in step S114), CPU 102 extracts a predetermined number of images that can be used as the candidate images from the set of images formed in step S108C except the candidate image selected in step S114 (step S115C). Then, CPU 102 associates the user ID entered in step S102, the candidate image selected in step S114 and the dummy images extracted in step S115C with each other, and adds them as personal authentication data 155 for the new user to authentication data 154 (step S116C). Thus, the sets each including the objects that are the selected correct key and the plurality of images to be displayed together with the correct key are registered for the respective users. Then, the processing ends.

<Operation and Effect>

The authentication system according to the embodiment can avoid such a situation that the image registered as a certain correct key is displayed as the dummy image in the authentication screen for another user. This can maintain a higher security level.

Further Another Embodiment (1)

The first to third embodiments have been described in connection with the example of the form that uses so-called icons as the images. However, ordinary photographs may be used. Also, character strings having certain meaning may be used.

Figure 27:
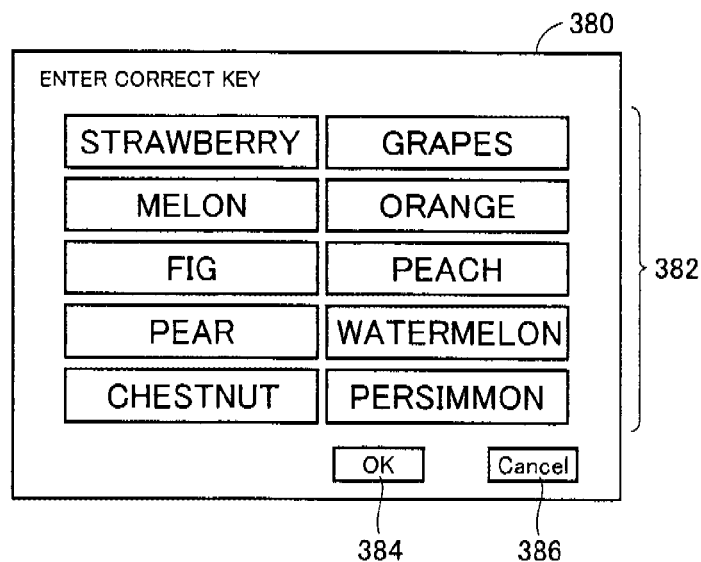
FIG. 27 shows an example of an authentication screen displayed in the authentication system according to a certain embodiment of the invention.

FIG. 27 shows an example of authentication screen 380 displayed by the authentication system according to a certain embodiment of the invention. FIG. 27 shows an example of the case where a plurality of character strings each indicating a name of fruit are used as the correct and dummy images in authentication screen 380. Thus, a plurality of character strings 382 are displayed in a list form as candidate objects of the correct key. When a user selects an OK button 384 after selecting a certain character string, the selection of the correct key is confirmed. When the user selects a Cancel button 386, the image already selected is cancelled.

Further Another Embodiment (2)

The authentication system according to this embodiment can be applied to systems other than that formed of MFP 10 and PC 20 shown in FIG. 1 already described.

Figure 28:
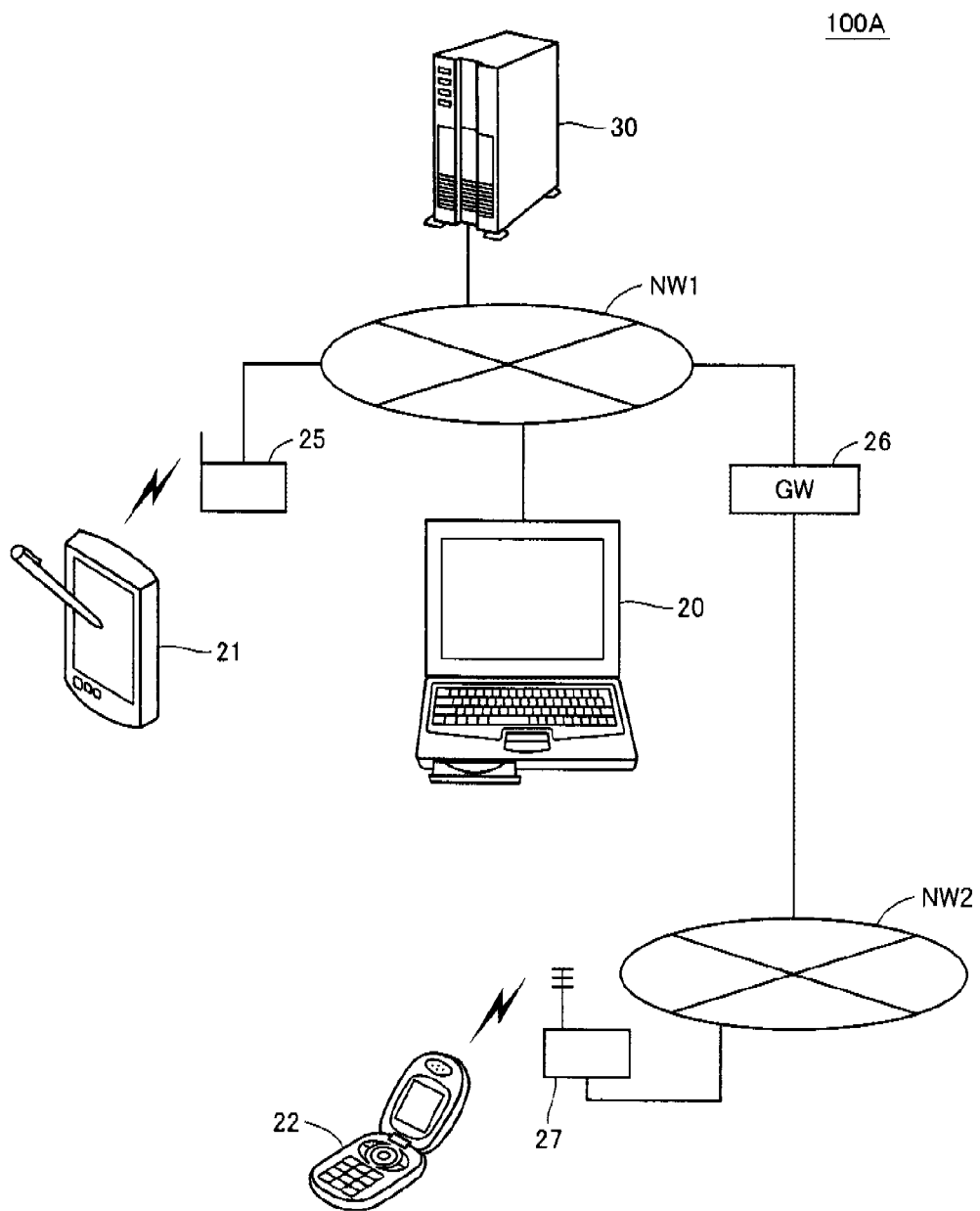
FIG. 28 shows a schematic structure of an authentication system according to a certain embodiment of the invention.

FIG. 28 shows a schematic structure of an authentication system 100A according to a certain embodiment of the invention.

Referring to FIG. 28, authentication system 100A includes a server device 30 connected to a network NW1. Server device 30 accepts the access from PC 20 connected to the same network NW1 as well as a portable terminal 21 such as a PDA and a cellular phone 22. Thus, portable terminal 21 accesses server device 30 through a radio relay station 25 connected to network NW1. Cellular phone 22 accesses server device 30 through a base station 27 and a network NW2 connected to base station 27.

The image authentication is executed when access is made from the various devices described above to server device 30. In a certain form, server device 30 executes the whole processing relating to the image authentication. In this case, for example, the system may provide the various images already described, using Web applications executed by portable terminal 21 and/or cellular phone 22.

In another form, server device 30 and portable terminal 21 or the like cooperate to execute the processing relating to the image authentication. In this case, a dedicated application has been installed in portable terminal 21 and the like, and this application provides the user interface and intermediate processing required for the image authentication.

The authentication system according to the embodiment can perform the authentication processing merely by selecting the image registered in advance, and therefore can improve the usability in the system that accepts the access from the portable terminals, cellular phones and the like, e.g., shown in FIG. 28.

Further Another Embodiment (3)

The embodiments have been described in connection with example of the implementation that determines overlapping degree F. from the three parameters, i.e., the number of registered users of the image, the period for which the image is registered as the correct key and the category to which the image belongs. However, overlapping degree F. may be determined by appropriately combining these parameters.

Further Another Embodiment (4)

The program for executing the control in the flowcharts already described can be provided by an arbitrary method. This kind of program may be provided as program products by storing it on non-transitory computer-readable recording mediums such as a flexible disc, CD-ROM, ROM, RAM or memory card attached to a computer. Alternatively, the program may be provided by storing it on a recording medium such as a hard disk in the computer. Further, the program may be provided by download over a network.

The above program may be configured to execute the processing by calling required program modules from among those provided as a part of an operating system (OS) of the computer according to a predetermined order and predetermined timing. In this case, the program itself does not include the above modules, and cooperates with the OS to execute the processing. This kind of program not including the module is also the program according to the embodiment.

The program according to the embodiment may be incorporated into a different program for providing it. In this case, the program itself does not include the modules included in the different program, and cooperates with the different program to execute the processing. This kind of program incorporated into the different program is also the program according to the embodiment.

The provided program is installed on a program storage unit such as a hard disk for executing it. The program product includes the program itself and the record medium storing the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An authentication method, provided in a system having a display and a storage device, comprising the steps of:

registering an object selected for a user from among a plurality of visually distinguishable objects as a key object in said storage device, said plurality of visually distinguishable objects, from which said key object is selected for said user, being prepared in advance;

after registering said key object for said user, and during an authentication process of the user, presenting a plurality of objects to said display including said registered key object associated with said user for user selection of said registered key object for authenticating said user;

accepting selection of an object by the user to be authenticated; and performing authentication based on matching/mismatching of the selected object with the key object registered in association with the user, wherein the step of registering said key object includes a step of determining a degree of freedom of selection of the object at the time of registration of the key object according to a degree of overlapping of the key object already registered in said storage device.

2. The authentication method according to claim 1, wherein the degree of overlapping is determined based on at least one of the number of users registered in association with the object, a period of registration of the object as the key object, and a category to which the object belongs.

3. The authentication method according to claim 2, wherein the degree of overlapping is determined based on the number of users registered in association with each object.

4. The authentication method according to claim 3, wherein the step of determining the degree of freedom of the selection includes a step of disabling the registration of an object as the key object when the number of users registered in association with that object or a total of the numbers of users including a user registered in association with that object exceeds a predetermined threshold value.

5. The authentication method according to claim 2, wherein the degree of overlapping is determined based on the total of the number(s) of the users registered in association with each of the objects belonging to an identical category.

6. The authentication method according to claim 5, wherein the step of determining the degree of freedom of the selection includes a step of disabling the registration of an object as the key object when the number of users registered in association with that object or a total of the numbers of users including a user registered in association with that object exceeds a predetermined threshold value.

7. The authentication method according to claim 1, wherein the step of determining the degree of freedom of the selection includes a step of displaying registerable object(s) among the plurality of objects prepared in advance, but not displaying unregisterable object(s) among the plurality of objects prepared in advance.

8. The authentication method according to claim 1, wherein the step of determining the degree of freedom of the selection includes a step of displaying registerable object(s) among the plurality of objects prepared in advance in a selectable fashion, and displaying unregisterable object(s) among the plurality of objects prepared in advance in an unselectable fashion.

9. The authentication method according to claim 1, wherein the step of determining the degree of freedom of the selection includes a step of displaying the object having a relatively low degree of overlapping with a higher priority.

10. The authentication method according to claim 1, wherein the step of registering includes a step of registering, for each user, a set of objects including the selected key object and a plurality of objects to be displayed together with the selected key object, and the step of determining the degree of freedom of the selection includes a step of displaying objects being registerable as the key object that are selected from among the plurality of objects prepared in advance except the objects included in the registered object set.

11. The authentication method according to claim 1, wherein the step of registering includes a step of performing the display allowing turning of pages each including a predetermined number of objects.

12. An authentication device comprising:

a display;

a storage device; and a processor operative to (i) register an object selected for a user from among a plurality of visually distinguishable objects as a key object in said storage device, said plurality of visually distinguishable object, from which said key object is selected for said user, being prepared in advance, (ii) present, after registering said key object for said user, and during an authentication process of said user, a plurality of objects to said display including said registered key object associated with said user, for user selection of said registered key object for authenticating said user, (iii) accept selection of an object by said user to be authenticated, and (iv) perform authentication based on matching/mismatching of the selected object with the key object registered in association with the user, wherein the processor is configured to determine a degree of freedom of selection of the object at the time of registration of the key object according to a degree of overlapping of the key object already registered in said storage device.

13. The authentication device according to claim 12, wherein the degree of overlapping is determined based on at least one of the number of users registered in association with the object, a period of registration of the object as the key object, and a category to which the object belongs.

14. The authentication device according to claim 12, wherein the processor is configured to display registerable object(s) among the plurality of objects prepared in advance, but not to display unregisterable object(s) among the plurality of objects prepared advance.

15. The authentication device according to claim 12, wherein said processor is configured to display registerable object(s) among the plurality of objects prepared in advance in a selectable fashion, and to display unregisterable object(s) among the plurality of objects prepared in advance in an unselectable fashion.

16. A non-transitory computer-readable storage medium, with instructions stored thereon for authentication processing, which when executed by a processor of a computer, cause the computer to:

register an object selected for a user from among a plurality of visually distinguishable objects as a key object in a storage device, said plurality of visually distinguishable object, from which said key object is selected for said user, being prepared in advance;

present, after registering said key object for said user, and during an authentication of the user, a plurality of objects to a display including said registered key object associated with said user for user selection of said registered key object for authenticating said user;

accept selection of an object by the user to be authenticated; and perform authentication based on matching/mismatching of the selected object with the key object registered in association with the user, wherein the step of registering said key object includes a step of determining a degree of freedom of selection of the object at the time of registration of the key object according to a degree of overlapping of the key object already registered in said storage device.

17. The non-transitory computer-readable storage medium according to claim 16, wherein the degree of overlapping is determined based on at least one of the number of the users registered in association with the object, a period of registration of the object as the key object, and a category to which the object belongs.

18. The non-transitory computer-readable storage medium according to claim 16, wherein the step of determining the degree of freedom of the selection includes disabling the registration of an object as the key object when the number of users registered in association with that object or a total of the numbers of users including a user registered in association with that object exceeds a predetermined threshold value.

19. The non-transitory computer-readable storage medium according to claim 16, wherein the step of determining the degree of freedom of the selection includes displaying registerable object(s) among the plurality of objects prepared in advance, but not displaying unregisterable object(s) among the plurality of objects prepared in advance.

\* \* \* \* \*